(12) United States Patent (10) Patent No.: US 12,097,656 B2
Zhang et al. (45) Date of Patent: Sep. 24, 2024

(54) 3D PRINTING METHOD FOR COMPLEX CURVED HOLLOW STRUCTURE, AND PRINTER

(71) Applicant: Zhejiang University, Zhejiang (CN)

(72) Inventors: Bin Zhang, Zhejiang (CN); Qian Xue, Zhejiang (CN); Qi Li, Zhejiang (CN); Liang Ma, Zhejiang (CN); Hua Ye, Zhejiang (CN)

(73) Assignee: Zhejiang University, Hangzhou (CN)

( * ) Notice: Subject to any disclaimer, the term of this patent is extended or adjusted under 35 U.S.C. 154(b) by 451 days.

(21) Appl. No.: 17/564,205

(22) Filed: Dec. 28, 2021

(65) Prior Publication Data

US 2022/0118687 A1 Apr. 21, 2022

Related U.S. Application Data

(63) Continuation of application No. PCT/CN2020/098456, filed on Jun. 28, 2020.

(30) Foreign Application Priority Data

Jun. 29, 2019 (CN) .......................... 201910581415.5
Jun. 29, 2019 (CN) .......................... 201910581416.X

(51) Int. Cl.
*B29C 64/124* (2017.01)
*B29C 64/209* (2017.01)
(Continued)

(52) U.S. Cl.
CPC .......... *B29C 64/124* (2017.08); *B29C 64/209* (2017.08); *B29C 64/241* (2017.08);
(Continued)

(58) Field of Classification Search
CPC ................ B29C 64/124; B29C 64/106; B29C 64/209; B29C 64/241; B29C 64/245;
(Continued)

(56) References Cited

U.S. PATENT DOCUMENTS

2017/0182681 A1* 6/2017 Meyers .................. B33Y 80/00

FOREIGN PATENT DOCUMENTS

| CN | 103565557 A | 2/2014 |
| CN | 105881908 A | 8/2016 |

(Continued)

OTHER PUBLICATIONS

Jan G. Dohlman et al., Boston Keratoprosthesis in Stevens-Johnson syndrome: a case of using infliximab to prevent tissue necrosis, Digital Journal of Ophthalmology, Feb. 20, 2009, vol. 15.
(Continued)

*Primary Examiner* — Nahida Sultana
*Assistant Examiner* — Debjani Roy

(57) ABSTRACT

The present invention provides a 3D printing method for a complex curved hollow structure. The 3D printing method comprises the following steps: firstly, manufacturing a bottom die attached with the complex curved hollow structure, and molding the complex curved hollow structure on a molding surface C of the bottom die by taking the bottom die as a support, wherein the molding of the bottom die and the molding of the complex curved hollow structure are completed in the same world coordinate system, and the bottom die does not need to be taken down from an objective table and then transplanted into a printing system of a to-be-molded part. The 3D printing method has the advantage that a high-precision complex curved hollow structure can be manufactured.

8 Claims, 5 Drawing Sheets

(51) Int. Cl.
*B29C 64/241* (2017.01)
*B29C 64/245* (2017.01)
*B33Y 10/00* (2015.01)
*B29L 11/00* (2006.01)

(52) U.S. Cl.
CPC ............ *B29C 64/245* (2017.08); *B33Y 10/00* (2014.12); *B29L 2011/0008* (2013.01)

(58) Field of Classification Search
CPC ............ B33Y 10/00; B29L 2011/0008; B29D 11/00442; B29D 11/023
See application file for complete search history.

(56) References Cited

FOREIGN PATENT DOCUMENTS

| | | |
|---|---|---|
| CN | 106414015 A | 2/2017 |
| CN | 207607113 U | 7/2018 |
| CN | 109080167 A | 12/2018 |
| CN | 110355998 A | 10/2019 |
| CN | 110355999 A | 10/2019 |
| CN | 110450413 A | 11/2019 |
| WO | 2018095837 A1 | 5/2018 |

OTHER PUBLICATIONS

Konrad Hille et al., Standards for Modified Osteoodontokeratoprosthesis (OOKP) Surgery According to Strampelli and Falcinelli, Cornea, Nov. 2005, pp. 895-908, vol. 24, No. 8.
International Search Report of PCT Patent Application No. PCT/CN2020/098456 issued on Sep. 28, 2020.

* cited by examiner

3D PRINTING METHOD FOR COMPLEX CURVED HOLLOW STRUCTURE, AND PRINTER

CROSS REFERENCE TO RELATED APPLICATIONS

The present application is a Continuation application of PCT Application No. PCT/CN2020/098456 filed on Jun. 28, 2020, which claims the benefit of Chinese Patent Application Nos. 201910581416.X and 201910581415.5 filed on Jun. 29, 2019. All the above are hereby incorporated by reference in their entirety.

TECHNICAL FIELD

The present invention relates to a 3D printing method for accurately molding a complex curved hollow structure and a printer.

BACKGROUND

With the development of biological manufacturing technology, 3D printing technology has become one of the important methods for tissue and organ repair, transplantation, and treatment and research of critical illness. The cornea, atrium, glomerulus, ovary, etc. are all hollow structures with complex curved surfaces, and the cornea is taken as an example for description.

The shortage of corneal transplant donors is a major challenge in the field of blindness treatment in the world. In China, there are more than 5 million, and at least 100,000 new cases are added every year. Among them, 94.7% of patients with corneal blindness can be recovered by corneal transplantation. However, every year, the donation of donors can only support 5,000 transplantation operations per month. The serious shortage of donors has led to an increasing number of corneal patients. Therefore, it is urgently to break through the method of in vitro biological manufacturing of cornea. The conventional methods such as tissue engineering and decellularization have not been widely used due to the difficulty in achieving precise multilayer molding, uncontrollable diopter and functional differences.

The cornea is the transparent part of the eye that covers the front portion of the eye, and its structure is shown in FIG. 1. The cornea is responsible for the main protection and refractive functions of the human eyes (the corneal refractive function accounts for 70 to 75% of the total refractive power). The refractive function is mainly related to the corneal shape, curvature, thickness and other topographic parameters. Corneal damage will lead to corneal blindness. Poor topographic control can easily lead to various corneal diseases such as refractive errors and astigmatism. Therefore, a customized corneal substitute with controllable diopter can effectively protect the optical function of the cornea. The external construction of corneal replacement is mainly based on its structure and refractive characteristics. The cornea is divided into 5 layers: epithelial cell layer, Bowman layer, stromal layer, Descemet membrane, and endothelial cell layer. The epithelial layer has 3 to 5 layers of epithelial cells, which protect the internal structure. The stromal layer accounts for 90% of the total thickness of the cornea. It is composed of corneal stromal cells and high-transparency collagen lamellae. The transparency of the cornea, shape integrity, thickness and radius of curvature are the key factors affecting the refractive power of the cornea.

Conventional corneal substitute manufacturing methods are mainly divided into two categories, namely, non-biological prosthesis mechanical processing methods, biofilm-type cell and tissue engineering preparation methods. The non-biological prosthesis mechanical processing method adopts non-degradable non-biological material, including an optical lens column and a bracket. The central optical lens column requires good optical performance and provides an optical channel for the eyes. It is often a transparent plastic product and cannot be dioptric. The stent is mainly used to fix the optical components and combine with the recipient tissue, and it is mainly made of metal or autologous bone. The prosthesis is mainly prepared by mechanical processing methods, which can achieve certain optical functions. Currently, the prosthesis is prepared according to uniform parameters. Due to the use of hard materials, autologous tissues are severely worn; the transplantation procedure is extremely complicated, and the postoperative field of vision is limited and unable to combine with the autologous tissue, and the appearance is very unsatisfactory, so it is only suitable for patients with end-stage keratopathy. The Boston-type corneal prosthesis, first reported by Dohlman, et al., adopts a polymethyl methacrylate (PMMA) lens cylinder and a titanium back plate bracket. The combination of the lens cylinder and the stent is similar to a nut, but this method usually produces tiny gaps, which can easily lead to postoperative infection. The bone-corneal flap prosthesis reported by Strampelli, et al. for the first time used a patient's own tooth root and alveolar bone to support the optical cylinder, which requires surgery to obtain autologous tissue, and the preparation method is very complicated. Therefore, there is great limitation on the corneal prostheses and it is difficult to promote.

Biomembrane preparation methods usually use biological materials, which are close to the natural cornea, but the dioptric ability of the biomembrane structure is uncontrollable. Conventional tissue engineering methods mainly have the following problems: firstly, for the planar membrane structure, its variable camber and topography of curved surface are difficult to accurately control, only a flat cornea with a certain light transmittance can be obtained, which cannot provide any refractive power; when applied to the clinic, it can only provide light to patients but cannot provide clear vision; secondly, animal corneal exfoliated cell matrix: it is difficult to completely remove the toxic reagents during the preparation process, and it has a rejection reaction; and its structure cannot be completely matched with the recipient's eyeballs, resulting in refractive problems; thirdly, the preparation process is complicated, the preparation cycle is long, and it is difficult to customize according to the individual morphology, and the comfort is poor.

SUMMARY

At present, the 3D printing method for the complex curved surface mainly comprises the steps that the printing tissue is attached to a support, and the support is molded in advance and then placed on an objective table of the 3D printer for printing. The molding of a supporting part is irrelevant to the molding of the complex curved surface structure, and the complex curved surface structure and the supporting part form a whole after molding. For manufacturing of a corneal prosthesis with refraction function, if the supporting part and the optical part are adopted to be molded through two 3D printers, the supporting part and the optical part are difficult to accurately fuse, and thus achieving of the refraction function is affected. In addition, the structure of the supporting part is difficult to completely fit the eyeball, and thus the refraction function of the corneal prosthesis is also affected.

Taking manufacturing of the corneal prosthesis as an example, the present invention aims to provide a 3D printing method and printer capable of manufacturing a complex curved hollow structure, wherein the shape of the hollow structure is capable of completely fitting the eyeball and the hollow structure has a refraction function.

In one aspect, the present invention provides a 3D printing method for manufacturing a cornea prosthesis.

The 3D printing method for the complex curved hollow structure is characterized by comprising the steps that a bottom die to which the complex curved hollow structure is attached is manufactured, and the bottom die is provided with a molding surface C with the shape consistent with that of the complex curved surface to be molded; then the bottom die serves as a support, and the complex curved hollow structure is molded on the molding surface C of the bottom die; and molding of the bottom die and molding of the complex curved hollow structure are completed under the same world coordinate system, that is, after the bottom die is molded, a to-be-molded part is printed on the molding surface C of the bottom die in situ, and the bottom die does not need to be taken down from an objective table and then transplanted into a printing system of the to-be-molded part.

According to the printing method, the bottom die is manufactured firstly, and the bottom die is provided with the complex curved surface; and then the surface of the bottom die is coated with liquid-phase biological ink, the biological ink is cured, and the complex curved hollow structure is obtained. The inner surface of the hollow structure is matched with the outer surface of the bottom die, and when the hollow structure is molded, the bottom die plays a role in supporting the biological ink, so that a spherical shell cannot collapse, and the accurate curved surface shape is achieved.

Preferably, the molding of the bottom die and the molding of the complex curved hollow structure are located under the same world coordinate system and are achieved by sharing the objective table by two sets of printing systems, after the bottom die is molded on the objective table, the bottom die and a molding part of the complex curved hollow structure are subjected to tool setting, and then additive molding is achieved on the molding surface C of the bottom die. When the complex curved hollow structure is molded in an extrusion mode, the molding part is an extrusion nozzle. If SLA molding is adopted, the molding part is an optical part for curing materials.

As a preferable solution, the present invention provides a specific molding method of the bottom die and the complex curved hollow structure, and the method comprises the following steps that a digital model of the bottom die is established, and the shape of the molding surface C of the bottom die is the surface shape of the eyeball implanted into the conical prosthesis; a digital model of the to-be-molded part is obtained on the surface of the digital model of the bottom die, and the digital model of the to-be-molded part is the corneal prosthesis of the complex curved hollow structure; and 3D printing path planning is conducted on the digital model of the to-be-molded part, and additive printing is conducted by using the extrusion mode and taking the molding surface C of the bottom die as a support. A solid model of the to-be-molded part is obtained through extrusion printing, the bottom face of the solid model of the to-be-molded part is matched with the molding surface C of the bottom die, which is the complex curved surface.

The parameters of the corneal prosthesis include the curvature radius and thickness of a cornea and can be obtained through statistical data of the cornea of a natural person.

Preferably, the bottom face of the bottom die is a plane, and the bottom die is a solid body.

The present invention provides a specific method for manufacturing the bottom die and realizing connection between the bottom die and the to-be-molded part. Preferably, the solid model of the bottom die is manufactured by using a DLP molding method, during DLP molding, the bottom die is arranged at the lower part, the objective table is arranged at the upper part, and the bottom die is molded on the objective table in a lifting manner; after the bottom die is molded, the objective table rotates around a middle shaft by 180 degrees, so that the bottom die is arranged at the upper part, and the objective table is arranged at the lower part; the extrusion nozzle and the bottom die are subjected to tool setting, a coordinate system of the solid model of the bottom die in an extrusion method is identical to that of the solid model of the bottom die in the DLP molding method, and the extrusion nozzle is aligned with a starting point position of molding in the extrusion method.

In the upward lifting type DLP molding method, a light source is arranged below a liquid tank, the objective table for loading the solid model is positioned in the liquid tank, and in the DLP molding process, the objective table ascends in a stepping manner, and one layer thickness is molded during each ascending; the DLP molding method and the extrusion method share one objective table, and a charging barrel in the extrusion method is positioned above the liquid tank; after the bottom die is printed, the objective table ascends to be separated from the liquid tank, then the objective table is overturned by 180 degrees and faces the charging barrel in the extrusion method, and the central position of the objective table is unchanged before and after the objective table rotates.

The center of the DLP light source is aligned with the center of the objective table, and the center of an extrusion path in the extrusion method is overlapped with the center of the objective table.

The present invention provides another specific method for manufacturing the bottom die and achieving connection between the bottom die and the to-be-molded part. Preferably, an SLA molding method is used for manufacturing the solid model of the bottom die; during SLA molding, the bottom die is arranged on the upper part, the object table is arranged on the lower part, and the object table sinks to form the bottom die; after the bottom die is molded, a light source of the SLA is evacuated, the extrusion nozzle and the bottom die are subjected to tool setting, the coordinate system of the bottom die solid model in the extrusion method is identical to that of the bottom die solid model in the DLP molding method, and the extrusion nozzle is aligned with the starting point position of extrusion method molding.

In the step 2, a biodegradable material is used as biological ink.

In the step 2, the surface of the digital model of the cornea is divided into four parts, the first part is a circular area with the radius being 2 mm in the center of the visual axis of the cornea, the curvature change range of the area is smaller than 0.25 D, and the thickness is uniform; the second part is a side central area, the side central area is an annular area with the radius being 2-4 mm away from the center of the visual axis of the cornea, the curvature radius of the side central area is gradually increased from inside to outside, and the side central area is in smooth transition to an edge plane from the central spherical surface; the third part is a peripheral area, the peripheral area is an annular area with the radius being 4-5 mm away from the center of the visual axis of the cornea, and the peripheral area is an approaching flat surface; and the fourth part is a corneal limbus area, the corneal limbus area is an annular area for transition from the cornea to the sclera, and the thickness of the corneal limbus area is in smooth and uniform transition from the peripheral area to the sclera.

The present invention provides a specific method for molding the corneal prosthesis through an additive method. According to the preferred scheme, the extrusion nozzle extrudes materials in the form of liquid drops, and the liquid drops are spin-coated on the molding surface of the bottom die through the relative movement of the extrusion nozzle and the bottom die; and after the whole layer of liquid drops are spin-coated, the whole layer of materials are photo-cured, and thus the to-be-molded part is molded.

By means of the method, the corneal prosthesis which is high in surface smoothness precision and good in corneal continuity and is printed by continuously extruding the liquid drops can be manufactured.

The liquid drops are continuously extruded and coated on the surface of the bottom die. The higher the moving speed of the extrusion nozzle is, the smaller the film thickness formed through spin coating is. The lower the moving speed of the extrusion nozzle is, the larger the film thickness formed through spin coating is. Thus, the thickness of the to-be-molded part can be controlled by controlling the moving speed of the extrusion nozzle and/or the amount of the extruded liquid drops.

Preferably, the biological ink is in a liquid phase range during extrusion. The biological ink adopts an existing printing material.

Preferably, the to-be-molded part model is sliced in the height direction, and the path of the extrusion nozzle in each layer thickness is a complete circle. The extrusion nozzle only walks on one circular track in each layer, after liquid drops are extruded, the surface of the bottom die is coated with the liquid drops, and the extrusion nozzle coats the bottom die with a circle of biological ink in each layer. The circle center of the printing path is the center of the bottom die.

The liquid phase spin coating process is performed in a light-shielding printing or red light printing environment, and after spin coating is finished, the biological ink coating the bottom die is subjected to photocuring.

In the extrusion printing process, the temperature of the objective table is within the liquid phase temperature range of the biological ink, but is lower than the temperature of the biological ink in the extrusion nozzle. The objective table, the bottom die and the biological ink spin-coated on the bottom die can be subjected to temperature control only by arranging a temperature control mechanism on the objective table of an extrusion type printer.

The biological ink is kept in a liquid phase state in the charging barrel, after the bottom die is spin-coated with the liquid phase, the liquid drops are prevented from flowing downwards under the action of gravity, and therefore the temperature of the objective table is lower than the temperature of the extrusion nozzle, and as a result, the viscosity of the biological ink is improved. However, in order to enable the biological ink between the adjacent layers to be naturally fused, the biological ink on the bottom die needs to be kept in the liquid phase, and therefore the temperature of the objective table is within the liquid phase temperature range of the biological ink, but is lower than the temperature of the extrusion nozzle.

The present invention provides a second specific method for molding the corneal prosthesis through the additive method. As a preferred solution, the extrusion nozzle sprays ink on the surface of the bottom die through jet printing of a nano liquid drop group, and the ink-jet range of the nozzle is a fixed value. The jet area of the nozzle for ink-jet printing is fixed after being adjusted before a printing task is started.

The difference between the ink-jet mode and the spin coating mode is that the thickness of the coating is controlled by controlling the spin coating speed of spin coating liquid drops, and additive of the to-be-molded part is finished by spin coating of one layer. According to the ink-jet mode, the biological ink is sprayed on the surface of the bottom die in the form of a nano liquid drop group. The spraying range and thickness are fixed, and therefore when additive is achieved in the ink-jet printing mode, the to-be-molded part needs to be sliced according to the spraying thickness, additive is sprayed layer by layer, and curing is conducted once every time one layer is sprayed.

Specifically, the complex curved surface of the to-be-molded part is layered in the thickness direction to form multiple layers of curved surface models with the same thickness, and the thickness of each layer of curved surface model is the thickness of the nano liquid drops during ink-jet printing; each layer of curved surface model is sliced, and the thickness of each slice is the effective height covered by the nano liquid drops; and the path of the extrusion nozzle on each slice layer is a circle. During spraying, the ink-jet nozzle completes printing of each layer of curved surface model from inside to outside in sequence, and the nozzle is displaced according to the slice path of each layer of curved surface model.

The liquid phase spin coating material adding and ink jet material adding process is performed in the light-shielding printing or red light printing environment, and after material adding is finished, the biological ink on the bottom die is subjected to photocuring.

Preferably, in the extrusion printing process, the temperature of the objective table is within the liquid phase temperature range of the biological ink, but is lower than the temperature of the biological ink in the extrusion nozzle. The objective table, the bottom die and the biological ink spin-coated on the bottom die can be subjected to temperature control only by arranging a temperature control mechanism on the objective table of an extrusion type printer.

According to the core thought of the 3D printing method for the complex curved hollow structure, the bottom die is molded firstly, the bottom die is provided with the molding surface consistent with the complex curved surface, and then a hollow structure to-be-printed piece with the complex curved surface, such as the corneal prosthesis, is molded on the molding surface of the bottom die in an in-situ material adding manner.

The liquid spin coating and ink jet spraying belong to extrusion type printing manners.

On the second aspect, the present invention provides a 3D printer for realizing bottom die molding and molding a hollow structure to-be-molded part with a complex curved surface on a bottom die in situ.

A biological 3D printer comprises a base and an objective table, wherein a bottom die molding module and a to-be-printed part molding module are arranged on the base; the bottom die molding module and an extrusion molding module share one objective table; and after the bottom die molding module completes bottom die molding, the extrusion molding module forms the to-be-molded part on a molding surface of the bottom die in situ.

The bottom die molding module and the to-be-molded part molding module are positioned on the same base and use the same objective table, and coordinate system fusion or calibration of the two molding modules is realized by switching the position of the objective table, so that the two molding modules can be positioned under the same world coordinate system; and the fusion of a bottom die data model and a to-be-printed part data model is realized.

The present invention provides a specific structure of the bottom die molding module and the extrusion molding module. Preferably, the bottom die molding module is an upward lifting type DLP molding module, the DLP molding module is arranged on the lower part, and the extrusion molding module is arranged on the upper part; the objective table is connected with an objective table driving part, the objective table driving part comprises a lifting mechanism and a rotating mechanism, and the rotating mechanism enables the working surface of the objective table to be overturned to the objective table for an extrusion nozzle from a light source facing the DLP molding module.

The DLP molding module can be the same as an existing DLP molding device in structure and comprises a liquid tank, a light source, a lifting mechanism for lifting the objective table, a controller, etc. The extrusion molding module can also be of an existing extrusion structure and comprises an extrusion nozzle, a heat preservation structure, a controller, etc.

The core of the solution is that the bottom die molding module and the extrusion molding module of the to-be-molded part are integrated together, the DLP molding module is switched to the extrusion molding module through the rotating mechanism, and after bottom die is molded, the to-be-molded part can be formed on the bottom die in situ without transferring the bottom die.

During DLP molding, the objective table is located on the upper part, and the bottom die is located on the lower part. During extrusion molding, the objective table is located on the lower part, and the bottom die is located on the upper part. Therefore, after bottom die is molded, the objective table needs to be turned over by 180 degrees through the rotating mechanism, the bottom die which is originally downward is turned over, and then tool setting of the bottom die and the extrusion molding module is achieved. The objective table before being turned over and the objective table after being turned over are centered. The working surface of the objective table serves as an XOY plane, the lifting direction of the objective table or the extrusion nozzle serves as the Z axis, and DLP molding and extrusion molding share one objective table. When the objective table before being turned over and the objective table after being turned over are centered, the X axis and the Y axis of the DLP molding module and the X axis and the Y axis of the extrusion molding module are consistent, the Z axes of the two molding modules are located on the same straight line, and only the Z axis direction and coordinate values are changed. Therefore, during extrusion printing path planning, three-dimensional data information of the DLP molding module can be directly used, and two times of printing molding of the bottom die and the to-be-molded part are achieved.

As a preferable solution, the DLP light source and a liquid tank support are fixed to the base, the liquid tank is fixed to the liquid tank support, the DLP light source is arranged below the liquid tank, and a bottom plate of the liquid tank is a light-transmitting plate; when the printer starts to work, the objective table is located in the liquid tank; a reflector is arranged between the DLP light source and the liquid tank, the DLP light source is aligned with the reflector, and light rays output by the reflector are aligned with the liquid tank. Thus, the light path of the DLP light source is changed through the reflector, and the height space occupied by the DLP light source is reduced.

A three-axial horizontal movement mechanism is arranged on the base and comprises an X-axial moving unit, a Y-axial moving unit and a Z-axial moving unit, wherein each moving unit comprises a driving motor and a transmission mechanism; the extrusion nozzle is arranged on the Z-axial moving unit; and the Z-axial moving unit is connected with the X-axial moving unit and the Y-axial moving unit at the same time.

The Z-axial moving unit achieves switching of the extrusion nozzle on the slice layer, the X-axial moving unit and a Y-axial moving unit achieve moving of the extrusion nozzle at any point of the current slice layer, and circular track printing is finished. The transmission mechanism is a lead screw and nut mechanism, a drive motor is connected with a lead screw, a nut is connected with a moving block, and the moving block is provided with a limiting piece for limiting the rotating freedom degree of the moving block. A mechanism that the lead screw rotates, and the nut moves in the axial direction of the lead screw is of an existing structure.

The base is provided with a longitudinal frame in the height direction and a transverse frame in the horizontal direction, and the transverse frame is arranged on the top of the longitudinal frame. The X-axial moving unit is arranged in the transverse frame, and the Y-axial moving unit is arranged in the longitudinal frame. The working surface of the objective table is located on the XOY plane or is parallel to the XOY plane, the X axis and the Y axis are opposite, one direction is the X axis, and the axis orthogonal to the X axis is the Y axis.

An objective table lifting mechanism is installed in a longitudinal frame and comprises a lifting motor, the transmission mechanism, and a pair of connecting arms connected with the objective table. The transmission mechanism is a lead screw and nut mechanism, the rotation freedom degree of the nut is limited, the nut only moves horizontally in the axial direction of the lead screw, and the nut is fixed to the connecting arms. The transmission mechanism can also be in other forms such as a gear rack and a guide rail sliding block, as long as the power of the lifting motor can be converted into lifting of the objective table. There are a couple of connecting arms of the objective table, the connecting arms are symmetrically arranged on the two sides of the objective table. The two connecting arms are connected with the objective table at the same time, and thus the objective table is stressed uniformly and is stable in position.

The Z-axial moving unit is provided with a Z-axial support, the driving motor and the transmission mechanism of the Z-axial moving unit are arranged on the Z-axial support, and the Z-axial support is connected with the nut of the X-axial moving unit and the nut of the Y-axial moving unit at the same time. Thus, the Z-axial moving unit can move at any point position of the XOY plane.

A first overturning structure of the objective table is defined as follows:

As a preferred solution, an overturning shaft of the objective table is a center line of the objective table; overturning is carried out by taking the center line of the objective table as a rotating shaft, and the required overturning space is minimum;

The rotating motor is fixed on one connecting arm, and an output shaft of the rotating motor is fixed to the objective table and is aligned to the center line of the objective table; a rotating fulcrum is arranged between the other connecting arm and the objective table; under such condition, the rotating motor is arranged outside the objective table, the objective table can be made into a thin plate, and the rotating motor needs to be sealed and packaged for waterproof treatment; the rotating motor is fixed to the connecting arms, and the output shaft of the rotating motor drives the objective table to rotate relative to the connecting arms so that the overturning of the objective table is realized; the rotating fulcrum is provided with a bearing.

Or, the objective table comprises a shell with a sealed inner cavity, and the molding surface of the shell is a working surface; the rotating motor is fixed in the inner cavity, the objective table is provided with the rotating shaft, and the rotating shaft is positioned on the central axis of the objective table; the rotating motor is connected with the rotating shaft through a rotating transmission mechanism, and the two ends of the rotating shaft are respectively fixed to the connecting arms; the rotating motor is fixed to the objective table, the rotating shaft is fixed to the connecting arms, when the rotating motor outputs torque, the rotating shaft is fixed, and the rotating motor drives the objective table to rotate around the rotating shaft, thus the overturning of the objective table is realized; a temperature control module of the objective table can also be arranged in the sealed inner cavity; the rotating motor is packaged in the objective table, and the rotating shaft does not move so that waterproof packaging of the objective table is easily realized; however, the torque output by the rotating motor is larger than that of the solution that the rotating motor is arranged outside the objective table.

A second overturning mode of the objective table is that the objective table overturns around one point on the supporting arm, and a second overturning structure of the objective table is defined as follows:

As a preferred solution, the rotating motor is arranged between the connecting arms and the nut of the objective table lifting device, a motor base of the rotating motor is fixed to the nut, and the output shaft of the rotating motor is fixed to the connecting arms. The mode can also realize forward and reverse overturning of the objective table, but the solution that the needed overturning space and the overturning shaft are in the center line position is large. The objective table can be overturned only after being lifted to a position where the bottom die is higher than the liquid tank.

Or, the front surface of the objective table is the working surface, the back surface of the objective table is provided with the rotating motor, two sides of the objective table are provided with connecting side plates, each connecting side plate corresponds to one connecting arm, and the rotating motor is arranged between the connecting side plates and the connecting arms; when the motor base of the rotating motor is fixed to the connecting arms, the output shaft is fixed to the objective table; and when the motor base of the rotating motor is fixed to the connecting side plates, the output shaft is fixed to the connecting arms. The connecting side plates extend towards the back surface. According to the solution, the rotating motor can be arranged at a position higher than the liquid level of the liquid tank, and the rotating motor is not immersed in the liquid tank, so the objective table rotates by taking the connecting side plates as radiuses, and compared with the solution of rotating by taking the connecting supporting arm as the radius, the space required for overturning the objective table is reduced.

A through hole in clearance fit with the motor base of the rotating motor is molded in connecting arms, the motor base is located in the through hole, and a rotating bearing is arranged in the through hole. By means of such arrangement, the weight of the objective table and the weight of the connecting arms can be supported through the motor base of the rotating motor, and the output shaft of the rotating motor only bears rotating torque and does not bear shearing torque in the gravity direction.

The present invention provides another specific structure of the bottom die molding module and the extrusion molding module. Preferably, the bottom die molding module is a descending type SLA molding module, the SLA molding module and the extrusion molding module share the objective table, and the objective table is connected with the objective table driving part. In the SLA printing process, a light source is fixed, and the objective table descends in a stepping manner. After bottom die is molded, the objective table ascends to the height needed by extrusion type printing, and the extrusion molding module is switched to work. In the extrusion type printing process, the objective table is fixed, and an extrusion nozzle moves.

The SLA molding module can be the same as an existing SLA molding device in structure and comprises a liquid tank, a light source, a lifting mechanism enabling the objective table to ascend and descend, a controller, etc. The extrusion molding module can also be of an existing extrusion structure and comprises an extrusion nozzle, a heat preservation structure, the controller, etc.

The core of the solution is that the bottom die molding module and the extrusion molding module of the to-be-molded part are integrated together, after the bottom die is molded, only the objective table needs to ascend or descend to the working height needed by the extrusion molding module, the extrusion molding module and the bottom die are subjected to tool setting, then switching from bottom die molding to-be-molded part molding is achieved, and the to-be-molded part can be formed on the bottom die in situ without transferring the bottom die.

The SLA molding mode is a photocuring 3D printing mode that the light source is arranged on the upper part, the objective table is arranged on the lower part, and the objective table moves downwards in a stepping mode. The objective table is immersed in the liquid tank, and the thickness of liquid on the objective table is equal to the thickness of the molding layer. The SLA molding module and the extrusion molding module share one objective table, the XOY planes of the two molding modules are shared, the Z axis of the SLA light source is parallel to the Z axis of the extrusion nozzle; and when the two printing modes are switched, only one time of tool setting needs to be conducted, the Z axis of the SLA light source coincides with the Z axis of the extrusion nozzle, and then coordinate systems of the two printing modes can be consistent.

The SLA light source is a point light source, and the extrusion nozzle is located outside the irradiation area of the point light source. Therefore, in the SLA printing mode, the light source cannot cure feed liquid in the extrusion nozzle.

The base is provided with a three-axial translation mechanism, wherein the three-axial translation mechanism comprises an X-axial moving unit, a Y-axial moving unit and a Z-axial moving unit; each moving unit comprises a driving motor and a transmission mechanism; the Z-axial moving unit is connected with the X-axial moving unit and the Y-axial moving unit at the same time; and the SLA light source and the extrusion nozzle are both installed on the Z-axial moving unit. The SLA light source and the extrusion nozzle are relatively fixed, that is, the distance between the Z axis of the SLA light source and the Z axis of the extrusion nozzle is known, and the coordinate system of two printing modes can be consistent only through fine adjustment.

The objective table lifting mechanism is installed in the longitudinal frame and comprises the lifting motor, the transmission mechanism, and connecting arms connected with the objective table. The transmission mechanism is the lead screw and nut mechanism, the rotation freedom degree of the nut is limited, the nut only translates in the axial direction of the lead screw, and the nut and the connecting arms are fixed. The transmission mechanism can also be in other forms such as a gear rack and a guide rail sliding block, and only the power of the lifting motor needs to be converted into lifting power of the objective table.

A couple of connecting arms of the objective table is provided, and the connecting arms are symmetrically arranged on the two sides of the objective table, wherein the lifting motor is arranged on one connecting arm, and the other connecting arm is a driven part. The two connecting arms are connected with the objective table at the same time so that the objective table is stressed uniformly and is stable in position. Or, the objective table is only provided with one connecting arm, the connecting arm is fixed on one side of the objective table, and a reinforcing rib is arranged between the connecting arm and the objective table. As long as the connecting rigidity of the connecting arm and the objective table and the rigidity of the objective table are enough, the objective table can be stably lifted, and the objective table displacement precision required by 3D printing is achieved.

The Z-axial moving unit is provided with a Z-axial support; the driving motor and the transmission mechanism of the Z-axial moving unit are arranged on the Z-axial support, and the Z-axial support is connected with the nut of the X-axial moving unit and the nut of the Y-axial moving unit at the same time; the transmission mechanism is the lead screw and nut mechanism with lead screw rotation and nut translation, and the extrusion nozzle and the SLA light source are fixed on the nut of the Z-axial moving unit. Therefore, the Z-axial moving unit can move at any point position of the XOY plane.

The SLA objective table descending type printing mode is combined with the extrusion type printing mode, the light source and the extrusion nozzle are both located on the objective table, fusion of the two printing modes can be achieved only by adjusting the position of the Z axis, tool setting is simplified, and the structure of the objective table and the structure of the objective table lifting mechanism are simplified.

The present invention has the advantages that 1, through combination of two printing modes, the bottom die with the complex curved surface is molded firstly, the bottom die is a solid part, and therefore surface parameters such as curvature of the bottom die can be accurately controlled; and then the bottom die is used as the base, and the to-be-printed part attached to the complex curved surface is molded on the complex curved surface of the bottom die. The bottom die is used as the support, and the complex curved surface of the bottom die is coated with liquid-phase biological ink, so that additional of the to-be-molded part is achieved; the liquid-phase flowing and fusion characteristics of the biological ink are utilized, natural fusion of the biological ink of all slice layers or thickness layers is achieved through liquid level tension, and the hollow structure which is high in surface smoothness and accurate and controllable in diopter and has the stable complex curved surface is rapidly manufactured. And 2, the bottom die is used as the supporting part of the to-be-molded part, and therefore when the to-be-molded part is printed, an additional supporting part does not need to be introduced.

DETAILED DESCRIPTION

DLP Molding

Figure 3:
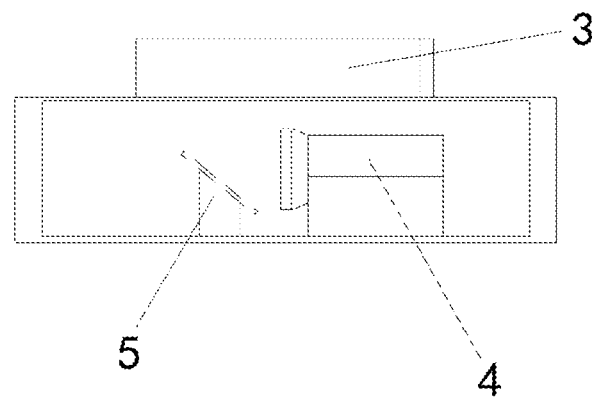
FIG. 3 is a schematic diagram of positions of a light source and a liquid tank of DLP molding.

DLP is abbreviation of Digital Light Processing, namely digital light processing, and according to this technology, digital processing is conducted on an influence signal firstly, and then light is projected. As shown in FIG. 3, DLP molding refers to a printing mode that a DLP projector is used for irradiating light rays to a photosensitive material, an objective table 2 is immersed into a liquid tank 3 containing the photosensitive material, and a whole layer of graph is molded or gathered each time. Lifting type stepping on the objective table 2 is adopted in the DLP molding mode. However, when a DLP light source 4 is arranged on the objective table 2, the objective table 2 can be driven to step in a descending mode, and additive during 3D printing is achieved.

SLA Molding

Figure 8:
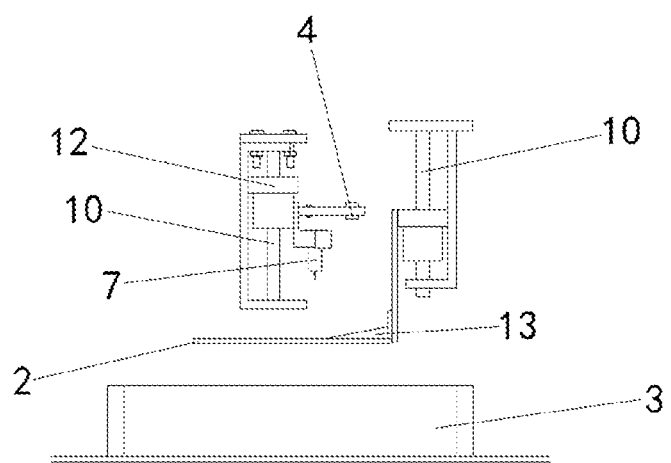
FIG. 8 is a schematic diagram of positions of a light source and a liquid tank of SLA molding.

SLA is abbreviation of Stereolithography, it is to deflect and irradiate laser to a proper point through a fast moving reflector 5 detector so as to induce a photosensitive material to polymerize at a fixed point, and the molding mode is that after a layer of specific shape and image construction is finished from point to surface, as shown in FIG. 8, the objective table 2 steps by a layer thickness to realize the curing of the next slice layer. The SLA molding mode recorded in detail in the present invention adopts the mode that an SLA light source 4 is arranged on the objective table 2 and descends. However, the solution of the present invention can also adopt the mode that the SLA light source 4 is arranged below the objective table 2 and ascends, and only the position of the SLA light source 4 needs to be changed.

Extrusion Molding

The extrusion molding mode is to read cross section information of different layer thicknesses of the to-be-molded part, perform additive to the cross sections by layers by using a liquid material and realize layer-by-layer printing, and thereby manufacturing an entity in a cross section stacking manner of each layer. According to the extrusion molding mode, a photosensitive material is extruded in a liquid drop form, and additive to each slice layer is realized.

Ink-Jet Printing Molding

A liquid photosensitive material mirror nozzle is changed into nanometer micro-particles or nanometer particles to be sprayed on a carrier (a bottom die in the text) during ink-jet printing, and the spraying range and the spraying thickness of the nozzle can be obtained through limited experiments.

Biological Ink

Biological ink or the photosensitive material refers to a material or a mixture used for being processed by a printer. When the 3D printer is used for processing, some existing biological materials can be used for printing. For example, many materials including natural polymers such as collagen, silk fibers, gelatin, alginate and synthetic polymers such as polyethylene glycol (PEG) or any one of them can be used for being processed by the printer. The materials serving as biological 3D printing materials are also called as the "biological ink". Although the materials belong to traditional materials, the materials can be used for printing by adopting printing equipment and the method.

3D Printing Method for a Complex Curved Hollow Structure

In the field of biological 3D printing, many biological structures are hollow structures with complex curved surfaces, such as cornea A, atrium, glomerulus and ovary which have complex curved surfaces, the hollow structures cannot be accurately molded through a conventional printing method, and the problem of tissue collapse can occur in the printing process. Therefore, it is needed to provide a 3D printing method which can efficiently achieve personalized customization and printing of biological tissue with the complex curved hollow structures and is adjustable in curvature of the complex curved surfaces.

The 3D printing method for a complex curved hollow structure comprises the following steps:
1, establishing a digital model of a bottom die, and manufacturing a solid model of the bottom die;
2, obtaining a digital model of a to-be-molded part on the surface of the digital model of the bottom die; and
3, carrying out 3D printing path planning on the digital model of the to-be-molded part, and carrying out additive printing by using an extrusion mode and taking the molding surface C of the bottom die as a support.

In some examples, in the step 1, the bottom die is an eyeball of a patient, eyeball data of the patient is obtained, an eyeball model of the patient is reconstructed, the eyeball model is provided with a surface attached to a cornea A, and the eyeball model is used as the digital model of the bottom die.

In the step 2, the to-be-molded part is the cornea A, and parameters of the cornea A comprise the curvature radius and the thickness of the cornea A; and the parameters of the cornea A can be obtained through statistical data of the cornea A of a natural person.

Figure 1:
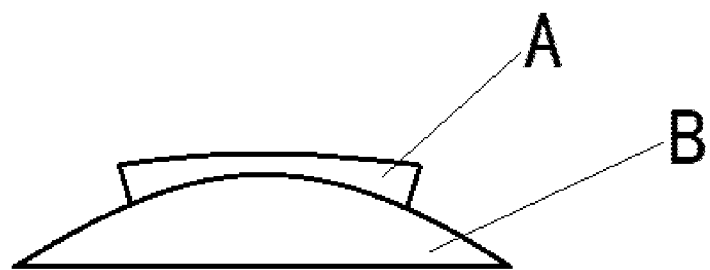
FIG. 1 is a schematic diagram of a cornea.

As shown in FIG. 1, a bottom die B is hemispherical, the bottom surface of the bottom die B is a plane, and the surface attached to the cornea A is located at the top of the bottom die B.

In the step 1, the solid model of the bottom die B is manufactured by using a DLP molding method; in the step 2, the to-be-molded part is molded by using the extrusion method; and after the solid model of the bottom die B is manufactured, an extrusion nozzle 7 of the extrusion method and the solid model of the bottom die B are sequentially subjected to tool setting, the solid model of the bottom die B of the extrusion method and the solid model of the bottom die B in the DLP molding method are consistent in coordinate system, and a needle cylinder is aligned with the starting point position of extrusion method molding.

An upward lifting type is adopted in the DLP molding method, as shown in FIG. 3, the light source 4 is arranged below the liquid tank 3, the objective table 2 for loading the solid model is located in the liquid tank 3; in the DLP molding process, the objective table 2 ascends in a stepping mode, and one layer thickness is increased each time; the DLP molding method and the extrusion method share one objective table 2, and a charging barrel of the extrusion method is located above the liquid tank 3; after printing of the bottom die B is finished, the objective table 2 ascends to be separated from the liquid tank 3, then the objective table 2 is turned over by 180 degrees and faces the charging barrel of the extrusion method, and the center position of the objective table 2 is not changed before and after the objective table 2 rotates.

The center of the DLP light source 4 is aligned with the center of the objective table 2, and the center of an extrusion path of the extrusion method coincides with the center of the objective table 2.

In the step 2, a biodegradable material is used as biological ink.

In the step 2, the surface of the digital model of the cornea A is divided into four parts, the first part is a circular area with the radius being 2 mm in the center of the visual axis of the cornea A, the curvature change range of the area is smaller than 0.25 D, and the thickness is uniform; the second part is a side central area, the side central area is an annular area with the radius being 2-4 mm away from the center of the visual axis of the cornea A, the curvature radius of the side central area is gradually increased from inside to outside, and the side central area is in smooth transition to an edge plane from the central spherical surface; the third part is a peripheral area, the peripheral area is an annular area with the radius being 4-5 mm away from the center of the visual axis of the cornea A, and the peripheral area is an approaching flat surface; the fourth part is a cornea A limbus area, the cornea A limbus area is an annular area for transition from the cornea A to the sclera, and the thickness of the cornea A limbus area is in smooth and uniform transition from the peripheral area to the sclera.

Spin-Coating Extrusion Printing

Figure 4:
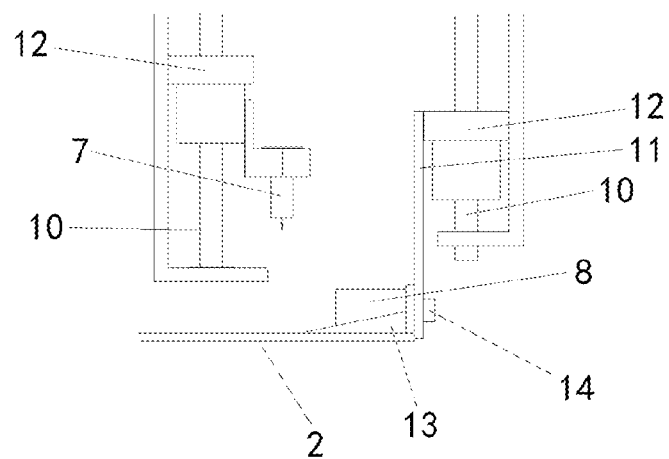
FIG. 4 is a schematic diagram of a position between an extrusion nozzle and an objective table of a first 3D printer.
Figure 9:
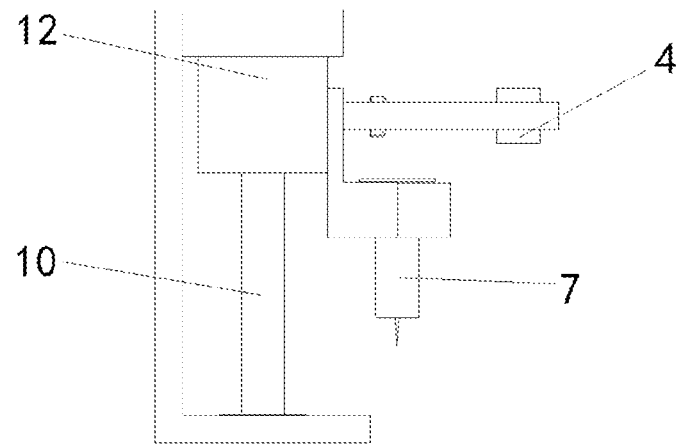
FIG. 9 is a schematic diagram of a position between an SLA light source and an extrusion nozzle.

In this solution, the bottom die B is adopted for fixing, as shown in FIG. 4 and FIG. 9, the extrusion nozzle 7 moves relative to the bottom die B to realize relative displacement between extruded liquid drops and the bottom die B, and liquid drop spin coating is achieved. The liquid drops are continuously extruded and smeared on the surface of the bottom die B. The higher the moving speed of the extrusion nozzle 7 is, the smaller the film thickness formed through spin coating is. The lower the moving speed of the extrusion nozzle 7 is, the larger the film thickness formed through spin coating is. Thus, the thickness of the to-be-molded part can be controlled by controlling the moving speed of the extrusion nozzle 7 and/or the amount of the extruded liquid drops.

In some examples, liquid biological ink is smeared on the surface of the bottom die B through a liquid phase spin coating method, and the biological ink is within the liquid phase range during extrusion. The biological ink adopts an existing printing material.

The to-be-molded part model is sliced in the height direction, and as shown in the FIG. 4 and FIG. 9, the path of the extrusion nozzle 7 in each layer thickness is a complete circle. The extrusion nozzle 7 only walks on one circular track in each layer, after liquid drops are extruded, the surface of the bottom die B is coated with the liquid drops, and the extrusion nozzle 7 coats the bottom die B with a circle of biological ink in each layer. The circle center of the printing path is the center of the bottom die B.

The liquid phase spin coating process is performed in a light-shielding printing or red light printing environment, and after spin coating is finished, the biological ink coating the bottom die is subjected to photocuring.

Figure 5:
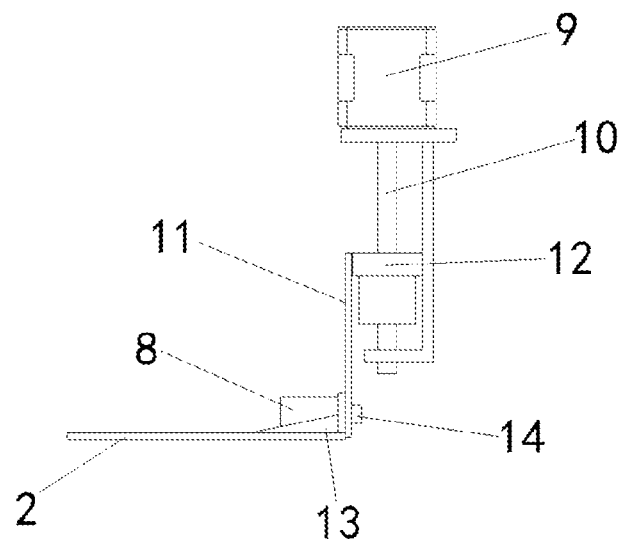
FIG. 5 is a schematic diagram of a structure of an objective table.

In the extrusion printing process, as shown in FIG. 5, the temperature of the objective table 2 is within the liquid phase temperature range of biological ink but is lower than the temperature of the biological ink in the extrusion nozzle 7. The objective table 2, the bottom die B and the biological ink spin-coated on the bottom die B can be subjected to temperature control only by arranging a temperature control mechanism on the objective table 2 of the extrusion printer.

The biological ink is kept in a liquid phase state in a charging barrel, and after the biological ink is spin-coated on the bottom die B in a liquid phase, liquid drops are prevented from flowing downwards under the action of gravity, so that the temperature of the objective table 2 is lower than the temperature of the extrusion nozzle 7, and the viscosity of the biological ink is improved. However, in order to naturally fuse the biological ink between adjacent layers, the biological ink on the bottom die B is kept in the liquid phase so that the temperature of the objective table 2 is within the liquid phase temperature range of the biological ink but is lower than the temperature of the extrusion nozzle 7.

3D Printer

A 3D printer needs to be provided for achieving the above printing method. The 3D printer is provided with two printing modules, one module is used for molding the bottom die B, and the other module is used for molding the to-be-molded part with the hollow structure on the bottom die B.

The 3D printer comprises a base 1, wherein a bottom die B molding module and a to-be-printed part molding module are arranged on the base 1, the bottom die B molding module and the extrusion molding module share one objective table 2, and the bottom die B molding module and the extrusion molding module are provided with a switching mechanism for switching the working surface of the objective table 2 from the bottom die B molding module to the extrusion molding module.

As shown in FIG. 8, the bottom die B molding module can be a liquid tank 3 type photocuring 3D printing SLA molding module that the liquid tank 3 is arranged on the lower part and the light source 4 is arranged on the upper part; as shown in FIG. 3, or the bottom B molding module is a DLP molding module that the liquid tank 3 is arranged on the upper part and the light source 4 is arranged on the lower part; or the bottom die B molding module is an extrusion type printing module.

The bottom die B molding module and the to-be-molded part molding module are located on the same base 1 and share the same objective table 2, coordinate system fusion or calibration of the two molding modules is achieved by switching the position of the objective table 2, and the two molding modules can be located under the same world coordinate system; and fusion of a bottom die B data model and a to-be-printed part data model is achieved.

3D Printer Combining DLP Molding and Extrusion Molding

The bottom die B is molded in a DLP photocuring molding mode, the to-be-printed part is molded on the bottom die B in an extrusion printing mode, and therefore the 3D printer for rapidly molding a complex curved hollow structure is achieved.

Figure 2:
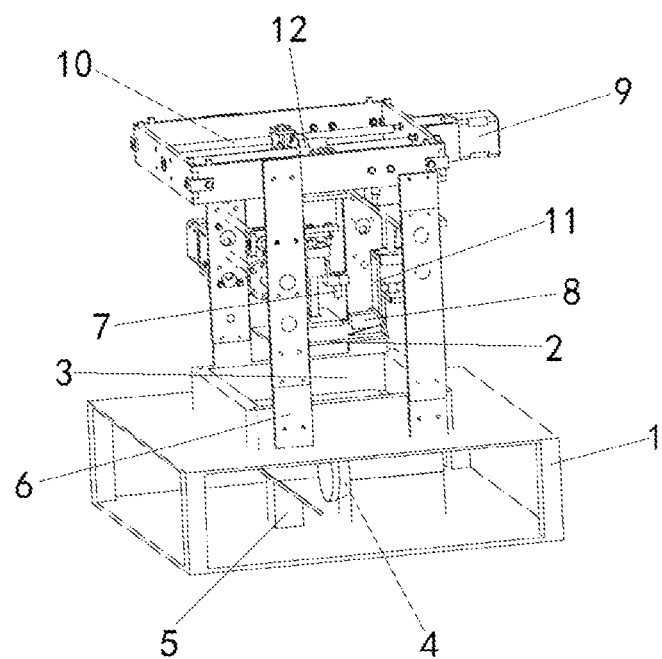
FIG. 2 is a schematic diagram of a first 3D printer in a DLP molding composite extrusion molding mode.

As shown in FIG. 2, a biological 3D printer comprises the base 1, an upward lifting type DLP molding module, an extrusion molding module, the objective table 2 and an objective table 2 driving part are arranged on the base 1, wherein the DLP molding module is arranged on the lower part, and the extrusion molding module is arranged on the upper part; the DLP molding module comprises the light source 4 and the liquid tank 3, and the extrusion molding module comprises the extrusion nozzle 7 and an extrusion control mechanism; the DLP molding module and the extrusion molding module share the objective table 2, and the objective table 2 driving part comprises an objective table 2 lifting mechanism and an objective table 2 rotating mechanism enabling the working surface of the objective table 2 to be turned over to the extrusion nozzle 7 from the light source 4 facing the DLP molding module. The objective table 2 rotating mechanism achieves switching from the DLP molding module to the extrusion molding module.

Figure 6:
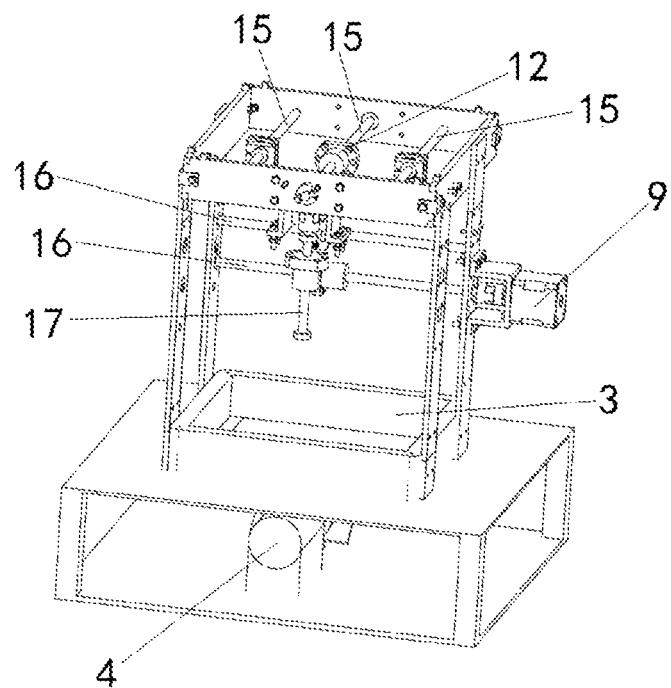
FIG. 6 is a schematic diagram of a three-axial translation mechanism.

The objective table 2 before overturning is aligned with the objective table 2 after overturning. As shown in FIG. 6, the working surface of the objective table 2 serves as an XOY plane, the lifting direction of the objective table 2 or the extrusion nozzle 7 serves as a Z axis 17, and DLP molding and extrusion molding share one objective table 2; when the objective table 2 before overturning is aligned with the objective table 2 after overturning, an X axis 15 and a Y axis 16 of the DLP molding module are consistent with an X axis 15 and a Y axis 16 of the extrusion molding module, the Z axes 17 of the two molding modules are located on the same straight line, and only the directions and coordinate values of the Z axes 17 are changed. Therefore, during path planning of extrusion printing, three-dimensional data information of the DLP molding module can be directly used, and two times of printing molding of the bottom die B and the to-be-molded part are achieved.

The DLP molding module of the upward lifting type objective table 2, as shown in FIG. 5, is that the light source 4 is located below the liquid tank 3, and the working surface of the objective table 2 faces downwards; printing of the bottom die B is finished in a DLP mode, then the objective table 2 is made to overturn upwards with the bottom die B, and the bottom die B faces the extrusion nozzle 7. The extrusion nozzle 7 conducts one-time tool setting, and then extrusion printing can be conducted.

In some examples, as shown in FIG. 3, the DLP light source 4 and a liquid tank support 6 are fixed to the base 1, the liquid tank 3 is fixed to the liquid tank support 6, the DLP light source 4 is arranged below the liquid tank 3, and a bottom plate of the liquid tank 3 is a light-transmitting plate; when the printer starts to work, the objective table 2 is located in the liquid tank 3. As shown in FIG. 3, a reflector 5 is arranged between the DLP light source 4 and the liquid tank 3, the DLP light source 4 is aligned with the reflector 5, and light rays output by the reflector 5 are aligned with the liquid tank 3. Thus, the light path of the DLP light source 4 is changed through the reflector 5 so that the height space occupied by the DLP light source 4 is reduced.

A three-axial translation mechanism is arranged on the base 1, as shown in FIG. 6, the three-axial translation mechanism comprises an X-axial 15-direction moving unit, a Y-axial 16-direction moving unit and a Z-axial 17-direction moving unit, each moving unit comprises a driving motor 9 and a transmission mechanism, the extrusion nozzle 7 is arranged on the Z-axial 17-direction moving unit, and the Z-axial 17-direction moving unit is connected with the X-axial 15-direction moving unit and the Y-axial 16-direction moving unit at the same time.

As shown in FIG. 6, the Z-axial 17-direction moving unit realizes switching of the extrusion nozzle 7 on the slice layer, and the X-axial 15-direction moving unit and the Y-axial 16-direction moving unit achieve moving of the extrusion nozzle 7 at any point of the current slice layer, and the circular track printing is finished. The transmission mechanism is a lead screw 10 and nut mechanism, a driving motor 9 is connected with a lead screw 10, a nut is connected with a moving block 12, and the moving block 12 is provided with a limiting piece for limiting the rotational degree of freedom of the moving block 12. A mechanism that the lead screw 10 rotate, and the nut moves in the axial direction of the lead screw 10 is of an existing structure.

The base 1 is provided with a longitudinal frame in the height direction and a transverse frame in the horizontal direction, and the transverse frame is arranged at the top of the longitudinal frame. The X-axial 15-direction moving unit is arranged in the transverse frame, and the Y-axial 16-direction moving unit is arranged in the longitudinal frame. The working surface of the objective table 2 is located on the XOY plane or parallel to the XOY plane, the X-axial 15 direction and the Y-axial 16 direction are opposite, one direction is the X-axial 15 direction, and the axial direction orthogonal to the X-axial 15 direction is the Y-axial 16 direction.

As shown in FIG. 6, the objective table 2 lifting mechanism is installed in the longitudinal frame and comprises a lifting motor, a transmission mechanism and a pair of connecting arms 11 connected with the objective table 2. The transmission mechanism is the lead screw 10 and nut mechanism, the rotation freedom degree of the nut is limited, the nut only translates in the axial direction of the lead screw 10, and the nut and the connecting arms 11 are fixed. The transmission mechanism can also be in other forms such as a gear rack and a guide rail sliding block, and only the power of the lifting motor needs to be converted into lifting power of the objective table 2. The connecting arms 11 of the objective table 2 are symmetrically arranged on the two sides of the objective table 2. The two connecting arms 11 are connected with the objective table 2 at the same time, so the objective table 2 is stressed uniformly and is stable in position.

The Z-axial 17-direction moving unit is provided with a Z-axial 17 support, the driving motor 9 and the transmission mechanism of the Z-axial 17-direction moving unit are arranged on the Z-axial 17 support, and the Z-axial 17 support is connected with the nut of the X-axial 15-direction moving unit and the nut of the Y-axial 16-direction moving unit at the same time. Thus, the Z-axial 17-direction moving unit can move at any point position of the XOY plane.

A first overturning structure of an objective table 2 is defined as follows:

As a preferred solution, as shown in FIG. 5, an overturning shaft of the objective table 2 is a center line of the objective table 2. The overturning is carried out by taking the center line of the objective table 2 as a rotating shaft, and the required overturning space is minimum.

As shown in FIG. 5, the rotating motor 8 is fixed on one connecting arm 11, and the output shaft of the rotating motor 8 is fixed to the objective table 2 and is aligned to the center line of the objective table 2; and a rotating fulcrum is arranged between the other connecting arm and the objective table 2. Under the condition, the rotating motor 8 is arranged outside the objective table 2, the objective table 2 can be made into a thin plate, and the rotating motor 8 needs to be sealed and packaged for waterproof treatment. The rotating motor 8 is fixed to the connecting arm 11, and the output shaft of the rotating motor 8 drives the objective table 2 to rotate relative to the connecting arms 11 so that the overturning of the objective table 2 is realized. The rotating fulcrum is provided with a bearing.

Or, as shown in FIG. 5, the objective table 2 comprises a shell with a sealed inner cavity, and the molding surface C of the shell is a working surface; the rotating motor 8 is fixed in the inner cavity, the objective table 2 is provided with the rotating shaft, and the rotating shaft is positioned on the central axis of the objective table 2; the rotating motor 8 is connected with the rotating shaft through a rotating transmission mechanism, and the two ends of the rotating shaft are respectively fixed to the connecting arms 11. The rotating motor 8 is fixed to the objective table 2, the rotating shaft is fixed to the connecting arms 11, when the rotating motor 8 outputs torque, the rotating shaft is fixed, the rotating motor 8 drives the objective table 2 to rotate around the rotating shaft, thus the overturning of the objective table 2 is realized. A temperature control module of the objective table 2 can also be arranged in the sealed inner cavity. The rotating motor 8 is packaged in the objective table 2, the rotating shaft does not move so that waterproof packaging of the objective table 2 is easy to achieve. However, the torque output by the rotating motor 8 is larger than that of the solution that the rotating motor 8 is arranged outside the objective table 2.

A second overturning mode of the objective table 2 is that the objective table 2 overturns around one point on the supporting arm, and a second overturning structure of the objective table 2 is defined as follows:

In some examples, the rotating motor 8 is arranged between the connecting arms 11 and the nut of the objective table 2 lifting device, a motor base of the rotating motor 8 is fixed to the nut, and the output shaft of the rotating motor 8 is fixed to the connecting arms 11. The mode can also realize forward and reverse overturning of the objective table 2, but the solution that the needed overturning space and the overturning shaft are in the center line position is large. The objective table 2 can be overturned only after being lifted to a position where the bottom die B is higher than the liquid tank 3.

In some examples, as shown in FIG. 5, the front face of the objective table 2 is the working surface, the back surface of the objective table 2 is provided with the rotating motor 8, two sides of the objective table 2 are provided with connecting side plates 13, each connecting side plate 13 corresponds to one connecting arm 11, and the rotating motor 8 is arranged between the connecting side plates 13 and the connecting arms 11; when the motor base of the rotating motor 8 is fixed to the connecting arms 11, the output shaft is fixed to the objective table 2; and when the motor base of the rotating motor 8 is fixed to the connecting side plates 13, the output shaft is fixed to the connecting arms 11. The connecting side plates 13 extend towards the back surface. According to the solution, the rotating motor 8 can be arranged at a position higher than the liquid level of the liquid tank 3, and the rotating motor 8 is not immersed in the liquid tank 3, so the objective table 2 rotates by taking the connecting side plates 13 as radius, and compared with the solution of rotating by taking the connecting arms as the radius, the space needed for overturning the objective table 2 is reduced.

As shown in FIG. 5, a through hole in clearance fit with the motor base of the rotating motor 8 is molded in connecting arms 11, the motor base is located in the through hole, and a rotating bearing 14 is arranged in the through hole. By means of such arrangement, the weight of the objective table 2 and the weight of the connecting arms 11 can be supported through the motor base of the rotating motor 8, and the output shaft of the rotating motor 8 only bears rotating torque and does not bear shearing torque in the gravity direction.

Printer in SLA Molding Composite Extrusion Molding

The bottom die B is molded in an SLA photocuring molding mode, the to-be-printed part is molded on the bottom die B in an extrusion printing mode, and therefore the 3D printer for rapidly molding a complex curved hollow structure is achieved.

Figure 7:
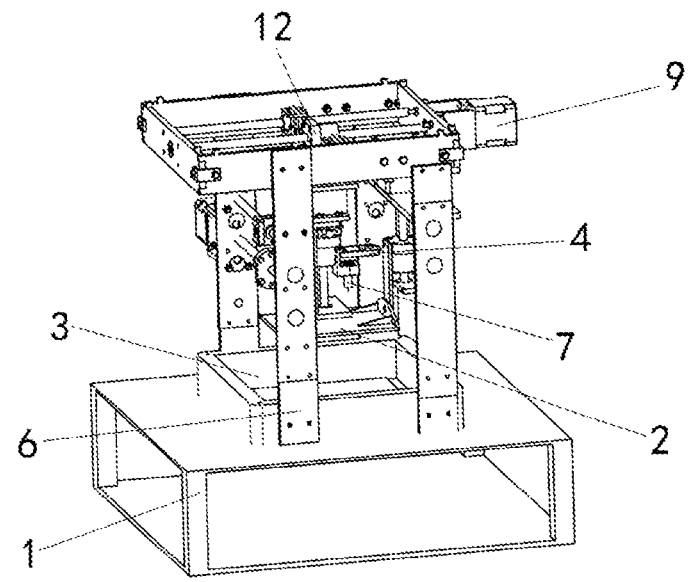
FIG. 7 is a schematic diagram of a second 3D printer in an SLA molding composite extrusion molding mode.

In some examples, the biological 3D printer, as shown in FIG. 7, comprises the base 1, wherein a descending type SLA molding module and the extrusion molding module are arranged on the base 1; the SLA molding module and the extrusion molding module share the objective table 2, and the objective table 2 is connected with the objective table 2 driving part; the SLA molding module comprises the light source 4 and the liquid tank 3, the objective table 2 driving part comprises the lifting motor and the connecting arms 11, and a connecting part is fixed to the objective table 2; the extrusion molding module comprises the extrusion nozzle 7 and the extrusion control device, and after the SLA molding module finishes a printing task, the extrusion molding module is started; in the SLA printing process, the light source 4 is fixed, and the objective table 2 descends in a stepping mode; and in the extrusion type printing process, the objective table 2 is fixed, and the extrusion nozzle 7 moves.

As shown in FIG. 8, the SLA molding mode is a photocuring 3D printing mode that the light source 4 is arranged on the upper part, the objective table 2 is arranged on the lower part, and the objective table 2 moves downwards in a stepping mode; the objective table 2 is immersed in the liquid tank 3, and the thickness of liquid on the objective table 2 is equal to the thickness of the molding layer. The SLA molding module and the extrusion molding module share one objective table 2, the XOY planes of the two molding modules are shared, and the Z axis 17 of the SLA light source 4 is parallel to the Z axis 17 of the extrusion nozzle 7. When the two printing modes are switched, only one time of tool setting needs to be conducted, the Z axis 17 of the SLA light source 4 coincides with the Z axis 17 of the extrusion nozzle 7, and then coordinate systems of the two printing modes can be unified As shown in FIG. 9, the SLA light source 4 is a point light source 4, and the extrusion nozzle 7 is located outside the irradiation area of the point light source 4. Thus, in the SLA printing mode, the light source 4 cannot cure feed liquid in the extrusion nozzle 7.

As shown in FIG. 6, the base 1 is provided with a three-axis translation mechanism, wherein the three-axis translation mechanism comprises an X-axial 15-direction moving unit, a Y-axial 16-direction moving unit and a Z-axial 17-direction moving unit; each moving unit comprises a driving motor 9 and a transmission mechanism, and the Z-axial 17-direction moving unit is connected with the X-axial 15-direction moving unit and the Y-axial 16-direction moving unit at the same time; and the SLA light source 4 and the extrusion nozzle 7 are both installed on the Z-axial 17-direction moving unit. The SLA light source 4 and the extrusion nozzle 7 are relatively fixed, that is, the distance between the Z-axial 17 of the SLA light source 4 and the Z-axial 17 of the extrusion nozzle 7 is known, and the coordinate systems of two printing modes can be consistent only by fine adjustment.

As shown in FIG. 8, the objective table 2 lifting mechanism is installed in the longitudinal frame and comprises the lifting motor, the transmission mechanism, connecting arms 11 connected with the objective table 2. The transmission mechanism is the lead screw 10 and nut mechanism, the rotation freedom degree of the nut is limited, the nut only translates in the axial direction of the lead screw 10, and the nut and the connecting arm 11 are fixed. The transmission mechanism can also be in other forms such as a gear rack and a guide rail sliding block, and only the power of the lifting motor can be converted into the lifting power of the objective table 2.

In some examples, a pair of connecting arms 11 of the objective table 2 is arranged, the connecting arms 11 are symmetrically arranged on the two sides of the objective table 2, the lifting motor is arranged on one connecting arm 11, and the other connecting arm 11 is the driven part. The two connecting arms 11 are connected with the objective table 2 at the same time, and thus the objective table 2 is stressed uniformly and is stable in position.

In other examples, as shown in FIG. 8, the objective table 2 is only provided with one connecting arm 11, the connecting arm 11 is fixed to one side of the objective table 2, and a reinforcing rib is arranged between the connecting arm 11 and the objective table 2. As long as the connecting rigidity of the connecting arm 11 and the objective table 2 and the rigidity of the objective table 2 are enough, stable lifting of the objective table 2 can be realized, and the displacement precision of the objective table 2 required by 3D printing is achieved.

The Z-axial 17-direction moving unit is provided with a Z-axial 17 support, the driving motor 9 and the transmission mechanism of the Z-axial 17-direction moving unit are arranged on the Z-axial 17 support, and the Z-axial 17 support is connected with the nut of the X-axial 15-direction moving unit and the nut of the Y-axial 16-direction moving unit at the same time; and the transmission mechanism is the lead screw 10 and nut mechanism with lead screw 10 rotation and nut translation, and the extrusion nozzle 7 and the SLA light source 4 are fixed on the nut of the Z-axial 17-direction moving unit. Therefore, the Z-axial 17-direction moving unit can move at any point position of the XOY plane.

As shown in FIG. 9, the SLA objective table 2 descending type printing mode is combined with the extrusion type printing mode, the light source 4 and the extrusion nozzle 7 are both located on the objective table 2, fusion of the two printing modes can be achieved only by adjusting the position of the Z axis 17, tool setting is simplified, and the structure of the objective table 2 and the structure of the objective table 2 lifting mechanism are simplified.

An Ink-Jet Printing Method for Replacing Extrusion Molding with Ink-Jet Type Molding A 3D printing method for a complex curved hollow structure comprises the following steps:

1, establishing a digital model of a bottom die B, and manufacturing a solid model of the bottom die B;
2, obtaining a digital model of a to-be-molded part in an ink-jet molding mode on the basis of the digital model of the bottom die B; and
3, performing 3D printing path planning on the digital model of the to-be-molded part, and coating the molding surface C of the bottom die B with liquid biological ink according to a printing path.

The method is an extrusion type corneal A printing method for manufacturing and printing a corneal A with high surface smoothness precision and good continuity by using the ink-jet printing mode.

In some examples, liquid biological ink is sprayed on the surface of the bottom die B through ink-jet printing, a nozzle for ink-jet printing sprays nano liquid drops to the bottom die B, and the ink-jet range of the nozzle is a fixed value. The jet area of the nozzle for ink-jet printing is fixed after being adjusted before a printing task is started.

The complex curved surface of the to-be-molded part is layered in the thickness direction to form multiple layers of curved surface models with the same thickness, and the thickness of each layer of curved surface model is the thickness of the nano liquid drops during ink-jet printing; each layer of curved surface model is sliced, and the thickness of each slice is the effective height covered by the nano liquid drops; and the path of an extrusion nozzle 7 on each slice layer is a circle. During spraying, the ink-jet nozzle completes printing of each layer of curved surface model from inside to outside in sequence, and the nozzle moves according to the slice path of each layer of curved surface model.

The liquid phase spin coating process is performed in a light-shielding printing or red light printing environment, and after spin coating is finished, the biological ink coating the bottom die B is subjected to photocuring.

In the extrusion printing process, the temperature of the objective table 2 is within the liquid phase temperature range of the biological ink, but is lower than the temperature of the biological ink in the extrusion nozzle 7. The objective table 2, the bottom die B and the biological ink spin-coated on the bottom die B can be subjected to temperature control only by arranging a temperature control mechanism on the objective table 2 of an extrusion type printer.

The present invention has the advantages that through combination of two printing modes, the bottom die B with the complex curved surface is molded firstly, the bottom die B is a solid part, and therefore surface parameters such as curvature of the bottom die B can be accurately controlled; and then the bottom die B is used as the base, and the to-be-printed piece attached to the complex curved surface is molded on the complex curved surface of the bottom die B. The bottom die B is used as the support, and the complex curved surface of the bottom die B is coated with liquid-phase biological ink, so that additional of the to-be-molded piece is achieved; and the liquid-phase flowing and fusion characteristics of the biological ink are utilized, natural fusion of the biological ink of all slice layers or thickness layers is achieved through liquid level tension, and the hollow structure which is high in surface smoothness and accurate and controllable in diopter and has the stable complex curved surface is rapidly manufactured.

Example 1

A 3D printing method for the complex curved hollow structure comprises the following steps: a bottom die to which the complex curved hollow structure is attached is manufactured, and the bottom die is provided with a molding surface C with the shape consistent with that of the complex curved surface to be molded; then the bottom die serves as a support, and the complex curved hollow structure is molded on the molding surface C of the bottom die; and molding of the bottom die and molding of the complex curved hollow structure are completed under the same world coordinate system, that is, after the bottom die is molded, a to-be-molded part is printed on the molding surface C of the bottom die in situ, and the bottom die does not need to be taken down from an objective table 2 and then transplanted into a printing system of the to-be-molded part.

According to the printing method, the bottom die is manufactured firstly, and the bottom die is provided with the complex curved surface; and then the surface of the bottom die is coated with liquid-phase biological ink, the biological ink is cured, and the complex curved hollow structure is obtained. The inner surface of the hollow structure is matched with the outer surface of the bottom die, and when the hollow structure is molded, the bottom die plays a role in supporting the biological ink, so that a spherical shell cannot collapse, and the accurate curved surface shape is achieved.

The molding of the bottom die and the molding of the complex curved hollow structure are located under the same world coordinate system and are achieved by sharing the objective table 2 by two sets of printing systems, after the bottom die is molded on the objective table 2, the bottom die and a molding part of the complex curved hollow structure are subjected to tool setting, and then additive molding is achieved on the molding surface C of the bottom die. When the complex curved hollow structure is molded in an extrusion mode, the molding part is an extrusion nozzle 7.

The 3D printing method comprises: a digital model of the bottom die is established, and the shape of the molding surface C of the bottom die is the surface shape of the eyeball implanted into the corneal prosthesis; a digital model of the to-be-molded part is obtained on the surface of the digital model of the bottom die, and the digital model of the to-be-molded part is the corneal prosthesis of the complex curved hollow structure; and 3D printing path planning is conducted on the digital model of the to-be-molded part, and additive printing is conducted by using the extrusion mode and taking the molding surface C of the bottom die as a support. A solid model of the to-be-molded part is obtained through extrusion printing, the bottom face of the solid model of the to-be-molded part is matched with the molding surface C of the bottom die, which is the complex curved surface.

As shown in FIG. 1, the parameters of the corneal prosthesis include the curvature radius and thickness of a cornea and can be obtained through statistical data of the cornea of a natural person. The bottom face of the bottom die is a plane, and the bottom die is a solid body.

The solid model of the bottom die is manufactured by using a DLP molding method, during DLP molding, the bottom die is arranged at the lower part, the objective table 2 is arranged at the upper part, and the bottom die is molded on the objective table 2 in a lifting manner; after the bottom die is molded, the objective table 2 rotates around a middle shaft by 180 degrees, so that the bottom die is arranged at the upper part, and the objective table 2 is arranged at the lower part; the extrusion nozzle 7 and the bottom die are subjected to tool setting, a coordinate system of the solid model of the bottom die in an extrusion method is identical to that of the solid model of the bottom die in the DLP molding method, and the extrusion nozzle 7 is aligned with a starting point position of molding in the extrusion method.

In the upward lifting type DLP molding method, as shown in FIG. 3, a light source 4 is arranged below a liquid tank 3, the objective table 2 for loading the solid model is positioned in the liquid tank 3, and in the DLP molding process, the objective table 2 ascends in a stepping manner, and one layer thickness is molded during each ascending; the DLP molding method and the extrusion method share one objective table 2, and a charging barrel in the extrusion method is positioned above the liquid tank 3; after the bottom die is printed, the objective table 2 ascends to be separated from the liquid tank 3, then the objective table 2 is overturned by 180 degrees and faces the charging barrel in the extrusion method, and the central position of the objective table 2 is unchanged before and after the objective table 2 rotates. The center of the DLP light source 4 is aligned with the center of the objective table 2, and the center of an extrusion path in the extrusion method is overlapped with the center of the objective table 2.

Example 2

This Example is different from the Example 1 as follows: an SLA molding method is used for manufacturing a solid model of a bottom die, and during SLA molding, the bottom die is arranged on the upper part, an objective table 2 is arranged on the lower part, and the objective table 2 sinks to form the bottom die; and after the bottom die is molded, a light source 4 of the SLA is evacuated, an extrusion nozzle 7 and the bottom die are subjected to tool setting, the coordinate system of the bottom die solid model in the extrusion method is identical to that of the bottom die solid model in a DLP molding method, and the extrusion nozzle 7 is aligned with the starting point position of extrusion method molding. The other steps are the same as the Example 1.

Example 3

This Example is different from the Example 1 as follows: an extrusion nozzle 7 extrudes materials in the form of liquid drops, and the liquid drops are spin-coated on a molding surface C of a bottom film by utilizing the relative motion of the extrusion nozzle 7 and a bottom die; after the whole layer of liquid drops are spin-coated, the whole layer of materials are photo-cured, and thus a to-be-molded part is molded. The other steps are the same as the Example 1.

By means of the method, the corneal prosthesis which is high in surface smoothness precision and good in corneal continuity and is printed by continuously extruding the liquid drops can be manufactured.

The liquid drops are continuously extruded and coated on the surface of the bottom die. The higher the moving speed of the extrusion nozzle 7 is, the smaller the film thickness formed by spin coating is. The lower the moving speed of the extrusion nozzle 7 is, the larger the film thickness formed by spin coating is. Thus, the thickness of the to-be-molded part can be controlled by controlling the moving speed of the extrusion nozzle 7 and/or the amount of the extruded liquid drops.

In the example, biological ink is within a liquid phase range during extrusion. The biological ink adopts an existing printing material.

The to-be-molded part model is sliced in the height direction, and as shown in the FIG. 4 and FIG. 9, the path of the extrusion nozzle 7 in each layer thickness is a complete circle. The extrusion nozzle 7 only walks on one circular track in each layer, after liquid drops are extruded, the surface of the bottom die B is coated with the liquid drops, and the extrusion nozzle 7 coats the bottom die B with a circle of biological ink in each layer. The circle center of the printing path is the center of the bottom die B. After the to-be-molded face C of the bottom die is coated with the biological ink layer by layer in a spin coating manner, the biological ink on the bottom die is cured.

The liquid phase spin coating process is performed in a light-shielding printing or red light printing environment, and after spin coating is finished, the biological ink coating the bottom die is subjected to photocuring.

In the extrusion printing process, the temperature of an object table 2 is within the liquid phase temperature range of the biological ink and is lower than the temperature of the biological ink in the extrusion nozzle 7. The objective table 2, the bottom die and the biological ink spin-coated on the bottom die can be subjected to temperature control only by arranging a temperature control mechanism on the objective table 2 of an extrusion type printer.

The biological ink is kept in a liquid phase state in a charging barrel, after the bottom die is spin-coated with the liquid phase, the liquid drops are prevented from flowing downwards under the action of gravity, and therefore the temperature of the objective table 2 is lower than the temperature of the extrusion nozzle 7, and as a result, the viscosity of the biological ink is improved. However, in order to enable the biological ink between the adjacent layers to be naturally fused, the biological ink on the bottom die needs to be kept in the liquid phase, and therefore the temperature of the objective table 2 is within the liquid phase temperature range of the biological ink, but is lower than the temperature of the extrusion nozzle 7.

Example 4

This Example is different from the Example 1 as follows: an extrusion nozzle 7 sprays ink the surface of a bottom die through ink-jet printing of a nano liquid drop group, and the ink-jet range of the nozzle is a fixed value. The jet area of the nozzle for ink-jet printing is fixed after being adjusted before a printing task is started. The other steps are the same as the Example 1.

Specifically, the complex curved surface of a to-be-molded part is layered in the thickness direction to form multiple layers of curved surface models with the same thickness, and the thickness of each layer of curved surface model is the thickness of nano liquid drops during ink-jet printing; each layer of curved surface model is sliced, and the thickness of each slice is the effective height covered by the nano liquid drops; and the path of the extrusion nozzle 7 on each slice layer is a circle. During spraying, the ink-jet nozzle completes printing of each layer of curved surface model from inside to outside in sequence, and the nozzle moves according to the slice path of each layer of curved surface model.

Figure 10:
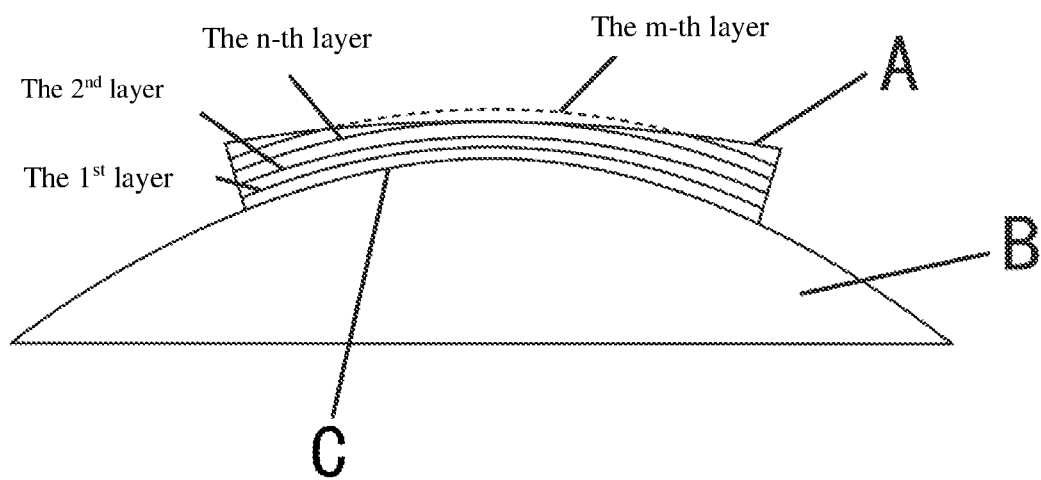
FIG. 10 is a schematic diagram of a slice layer.

A slice layer of the example is divided by slicing a molding curved surface according to the thickness of the curved surface of a to-be-molded part, as shown in FIG. 10, the to-be-molded part A can be divided into m layers, the first to $n^{th}$ layers are slice layers with the same shape as a molding surface C of a bottom die B, the $(n+1)^{th}$ to $m^{th}$ layers are sliced in the form of the molding surface C, part of the molding surface C is higher than the to-be-molded part, the higher part does not need to be formed by additive, and the part within the model range of the to-be-molded part serves as the slice layer.

The ink-jet material adding process is in the light-shielding printing or red light printing environment, and after material adding is finished, the biological ink on the bottom die is subjected to photocuring.

In the extrusion printing process, the temperature of an objective table 2 is within the liquid phase temperature range of the biological ink, but is lower than the temperature of the biological ink in an extrusion nozzle 7. The objective table 2, the bottom die and the biological ink spin-coated on the bottom die can be subjected to temperature control only by arranging a temperature control mechanism on the objective table 2 of an extrusion type printer.

Example 5

As shown in FIG. 2, a biological 3D printer comprises a base 1 and an objective table, wherein a bottom die molding module and a to-be-printed part molding module are arranged on the base 1; the bottom die molding module and an extrusion molding module share one objective table 2; and after the bottom die molding module completes bottom die molding, the extrusion molding module forms the to-be-molded part on a molding surface C of the bottom die in situ.

The bottom die molding module and the to-be-molded part molding module are positioned on the same base 1 and use the same objective table 2, and coordinate system fusion or calibration of the two molding modules is realized by switching the position of the objective table 2, so that the two molding modules can be positioned under the same world coordinate system; and the fusion of a bottom die data model and a to-be-printed part data model is realized.

The bottom die molding module is an upward lifting type DLP molding module, the DLP molding module is arranged on the lower part, and the extrusion molding module is arranged on the upper part; the objective table 2 is connected with an objective table 2 driving part, the objective table 2 driving part comprises a lifting mechanism and a rotating mechanism, and the rotating mechanism enables the working surface of the objective table 2 to be overturned to the objective table 2 for an extrusion nozzle 7 from a light source 4 facing the DLP molding module.

The DLP molding module can be the same as an existing DLP molding device in structure and comprises a liquid tank 3, a light source 4, a lifting mechanism for lifting the objective table 2, a controller, etc. The extrusion molding module can also be of an existing extrusion structure and comprises an extrusion nozzle 7, a heat preservation structure, a controller, etc.

During DLP molding, the objective table 2 is located on the upper part, and the bottom die is located on the lower part. During extrusion molding, the objective table 2 is located on the lower part, and the bottom die is located on the upper part. Therefore, after bottom die is molded, the objective table 2 needs to be turned over by 180 degrees through the rotating mechanism, the bottom die which is originally downward is turned over, and then tool setting of the bottom die and the extrusion molding module is achieved. The objective table 2 before being turned over and the objective table 2 after being turned over are centered. As shown in FIG. 6, the working surface of the objective table 2 serves as an XOY plane, the lifting direction of the objective table 2 or the extrusion nozzle 7 serves as the Z axis 17, and DLP molding and extrusion molding share one objective table. When the objective table 2 before being turned over and the objective table 2 after being turned over are centered, the X axis 15 and the Y axis 16 of the DLP molding module and the X axis 15 and the Y axis 16 of the extrusion molding module are consistent, the Z axes 17 of the two molding modules are located on the same straight line, and only the Z axis 17 direction and coordinate values are changed. Therefore, during extrusion printing path planning, three-dimensional data information of the DLP molding module can be directly used, and two times of printing molding of the bottom die and the to-be-molded part are achieved.

As shown in FIG. 3, the DLP light source 4 and a liquid tank support 6 are fixed to the base 1, the liquid tank 3 is fixed to the liquid tank support 6, the DLP light source 4 is arranged below the liquid tank 3, and a bottom plate of the liquid tank 3 is a light-transmitting plate; when the printer starts to work, the objective table 2 is located in the liquid tank 3; as shown in FIG. 3, a reflector 5 is arranged between the DLP light source 4 and the liquid tank 3, the DLP light source 4 is aligned with the reflector 5, and light rays output by the reflector 5 are aligned with the liquid tank 3. Thus, the light path of the DLP light source 4 is changed through the reflector 5, and the height space occupied by the DLP light source 4 is reduced.

A three-axial horizontal movement mechanism is arranged on the base 1, as shown in FIG. 6, the three-axial horizontal movement mechanism comprises an X-axial 15 moving unit, a Y-axial 16 moving unit and a Z-axial 17 moving unit, wherein each moving unit comprises a driving motor 9 and a transmission mechanism; the extrusion nozzle 7 is arranged on the Z-axial 17 moving unit; and the Z-axial 17 moving unit is connected with the X-axial 15 moving unit and the Y-axial 16 moving unit at the same time.

As shown in FIG. 6, the Z-axial 17 moving unit achieves switching of the extrusion nozzle 7 on the slice layer, the X-axial 15 moving unit and a Y-axial 16 moving unit achieve moving of the extrusion nozzle 7 at any point of the current slice layer, and circular track printing is finished. The transmission mechanism is a lead screw 10 and nut mechanism, a drive motor 9 is connected with a lead screw 10, a nut is connected with a moving block 12, and the moving block 12 is provided with a limiting piece for limiting the rotating freedom degree of the moving block 12. A mechanism that the lead screw 10 rotates, and the nut moves in the axial direction of the lead screw 10 is of an existing structure.

The base 1 is provided with a longitudinal frame in the height direction and a transverse frame in the horizontal direction, and the transverse frame is arranged on the top of the longitudinal frame. The X-axial 15 moving unit is arranged in the transverse frame, and the Y-axial 16 moving unit is arranged in the longitudinal frame. The working surface of the objective table 2 is located on the XOY plane or is parallel to the XOY plane, the X axis 15 and the Y axis 16 are opposite, one direction is the X axis 15, and the axis orthogonal to the X axis is the Y axis 16.

As shown in FIG. 6, an objective table 2 lifting mechanism is installed in a longitudinal frame, and the objective table 2 comprises a lifting motor, the transmission mechanism, and connecting arms 11 connected with the objective table 2. The transmission mechanism is a lead screw 10 and nut mechanism, the rotation freedom degree of the nut is limited, the nut only moves horizontally in the axial direction of the lead screw 10, and the nut is fixed to the connecting arms 11. The transmission mechanism can also be in other forms such as a gear rack and a guide rail sliding block, as long as the power of the lifting motor can be converted into lifting of the objective table 2. There are a couple of connecting arms of the objective table 2, the connecting arms 11 are symmetrically arranged on the two sides of the objective table 2. The two connecting arms 11 are connected with the objective table 2 at the same time, and thus the objective table 2 is stressed uniformly and is stable in position.

The Z-axial 17 moving unit is provided with a Z-axial 17 support, the driving motor 9 and the transmission mechanism of the Z-axial 17 moving unit are arranged on the Z-axial 17 support, and the Z-axial 17 support is connected with the nut of the X-axial 15 moving unit and the nut of the Y-axial 16 moving unit at the same time. Thus, the Z-axial 17 moving unit can move at any point position of the XOY plane.

As a preferred solution, as shown in FIG. 5, an overturning shaft of the objective table 2 is a center line of the objective table 2; overturning is carried out by taking the center line of the objective table 2 as a rotating shaft, and the required overturning space is minimum.

As shown in FIG. 5, the rotating motor 8 is fixed on one connecting arm 11, and an output shaft of the rotating motor 8 is fixed to the objective table 2 and is aligned to the center line of the objective table 2; a rotating fulcrum is arranged between the other connecting arm 11 and the objective table 2; under such condition, the rotating motor 8 is arranged outside the objective table 2, the objective table 2 can be made into a thin plate, and the rotating motor 8 needs to be sealed and packaged for waterproof treatment; the rotating motor 8 is fixed to the connecting arms 11, and the output shaft of the rotating motor 8 drives the objective table 2 to rotate relative to the connecting arms 11 so that the overturning of the objective table 2 is realized; the rotating fulcrum is provided with a bearing.

Or, as shown in FIG. 5, the objective table 2 comprises a shell with a sealed inner cavity, and the molding surface C of the shell is a working surface; the rotating motor 8 is fixed in the inner cavity, the objective table 2 is provided with the rotating shaft, and the rotating shaft is positioned on the central axis of the objective table 2; the rotating motor 8 is connected with the rotating shaft through a rotating transmission mechanism, and the two ends of the rotating shaft are respectively fixed to the connecting arms 11; the rotating motor 8 is fixed to the objective table 2, the rotating shaft is fixed to the connecting arms 11, when the rotating motor 8 outputs torque, the rotating shaft is fixed, and the rotating motor 8 drives the objective table 2 to rotate around the rotating shaft, thus the overturning of the objective table 2 is realized; a temperature control module of the objective table 2 can also be arranged in the sealed inner cavity; the rotating motor 8 is packaged in the objective table 2, and the rotating shaft does not move so that waterproof packaging of the objective table 2 is easily realized; however, the torque output by the rotating motor 8 is larger than that of the solution that the rotating motor 8 is arranged outside the objective table 2.

Example 6

This Example is different from the Example 5 as follows: an objective table 2 is overturned around one point on a supporting arm. Specifically, a rotating motor 8 is arranged between connecting arms 11 and a nut of an objective table 2 lifting device, a motor base of the rotating motor 8 is fixed to the nut, and an output shaft of the rotating motor 8 is fixed to the connecting arms 11. The mode can also realize forward and reverse overturning of the objective table 2, but the solution that the needed overturning space and an overturning shaft are in the center line position is large. The objective table 2 can be overturned only after being lifted to a position where a bottom die B is higher than a liquid tank 3.

Or, as shown in FIG. 5, the front face of the objective table 2 is a working surface, the back surface of the objective table 2 is provided with the rotating motor 8, two sides of the objective table 2 are provided with connecting side plates 13, each connecting side plate 13 corresponds to one connecting arm 11, and the rotating motor 8 is arranged between the connecting side plates 13 and the connecting arms 11; when the motor base of the rotating motor 8 is fixed to the connecting arms 11, the output shaft is fixed to the objective table 2; and when the motor base of the rotating motor 8 is fixed to the connecting side plates 13, the output shaft is fixed to the connecting arms 11. The connecting side plates 13 extend towards the back surface. According to the solution, the rotating motor 8 can be arranged at a position higher than the liquid level of the liquid tank 3, and the rotating motor 8 is not immersed in the liquid tank 3, so the objective table 2 rotates by taking the connecting side plates 13 as radius, and compared with the solution of rotating by taking the connecting arms as the radius, the space needed for overturning the objective table 2 is reduced.

As shown in FIG. 5, a through hole in clearance fit with the motor base of the rotating motor 8 is molded in the connecting arms 11, the motor base is located in the through hole, and a rotating bearing 14 is arranged in the through hole. By means of such arrangement, the weight of the objective table 2 and the weight of the connecting arms 11 can be supported through the motor base of the rotating motor 8, and an output shaft of the rotating motor 8 only bears rotating torque and does not bear shearing torque in the gravity direction. The other structures are the same as those of the example 5.

Example 7

This Example is different from the Example 5 as follows: as shown in FIG. 7, a bottom die molding module is a descending type SLA molding module, the SLA molding module and an extrusion molding module share an objective table 2, and the objective table 2 is connected with an objective table driving part; in the SLA printing process, a light source 4 is fixed, and the objective table 2 descends in a stepping mode; after a bottom die is molded, the objective table 2 ascends to the height needed by extrusion type printing, and the extrusion molding module is switched to work; in the extrusion type printing process, the objective table 2 is fixed, and an extrusion nozzle 7 moves. The other structures are the same as those of the example 5.

The SLA molding module can be the same as an existing SLA molding device in structure and comprises a liquid tank 3, the light source 4, a lifting mechanism enabling the objective table 2 to ascend and descend, a controller, etc. The extrusion molding module can also be of an existing extrusion structure and comprises the extrusion nozzle 7, a heat preservation structure, a controller, etc.

The core of the solution is that the bottom die molding module and the extrusion molding module of a to-be-molded part are integrated together, after the bottom die is molded, only the objective table 2 needs to ascend or descend to the working height needed by the extrusion molding module, the extrusion molding module and the bottom die are subjected to tool setting, then switching from bottom die molding to-be-molded part molding is achieved, and the to-be-molded part can be formed on the bottom die in situ without transferring the bottom die.

The SLA molding mode is a photocuring 3D printing mode that a light source 4 is arranged on the upper part, the objective table 2 is arranged on the lower part, and the objective table 2 moves downwards in a stepping mode. The objective table 2 is immersed in a liquid tank 3, and the thickness of liquid on the objective table 2 is equal to the thickness of a molding layer. The SLA molding module and the extrusion molding module share one objective table 2, the XOY planes of the two molding modules are shared, and the Z axis 17 of the SLA light source 4 is parallel to the Z axis 17 of the extrusion nozzle 7. When the two printing modes are switched, only one time of tool setting needs to be conducted, the Z axis 17 of the SLA light source 4 and the Z axis 17 of the extrusion nozzle 7 coincide, and then coordinate systems of the two printing modes can be consistent.

The SLA light source 4 is a point light source 4, and the extrusion nozzle 7 is located outside the irradiation area of the point light source 4. Thus, in the SLA printing mode, the light source 4 cannot cure feed liquid in the extrusion nozzle 7.

As shown in FIG. 6, a base 1 is provided with a three-axis translation mechanism, wherein the three-axis translation mechanism comprises an X-axial 15-direction moving unit, a Y-axial 16-direction moving unit and a Z-axial 17-direction moving unit; each moving unit comprises a driving motor 9 and a transmission mechanism, and the Z-axial 17-direction moving unit is connected with the X-axial 15-direction moving unit and the Y-axial 16-direction moving unit at the same time; and the SLA light source 4 and the extrusion nozzle 7 are both installed on the Z-axial 17-direction moving unit. The SLA light source 4 and the extrusion nozzle 7 are relatively fixed, that is, the distance between the Z-axial 17 of the SLA light source 4 and the Z-axial 17 of the extrusion nozzle 7 is known, and the coordinate systems of the two printing modes can be consistent only by fine adjustment.

An objective table 2 lifting mechanism is installed in a longitudinal frame and comprises a lifting motor, a transmission mechanism, connecting arms 11 connected with the objective table 2. The transmission mechanism is a lead screw 10 and nut mechanism, the rotation freedom degree of a nut is limited, the nut only translates in the axial direction of a lead screw 10, and the nut and the connecting arm 11 are fixed. The transmission mechanism can also be in other forms such as a gear rack and a guide rail sliding block, and only the power of the lifting motor can be converted into the lifting power of the objective table 2.

A pair of connecting arms 11 of the objective table 2 is arranged, the connecting arms 11 are symmetrically arranged on the two sides of the objective table 2, the lifting motor is arranged on one connecting arm 11, and the other connecting arm 11 is the driven part. The two connecting arms 11 are connected with the objective table 2 at the same time, and thus the objective table 2 is stressed uniformly and is stable in position. Or, the objective table 2 is only provided with one connecting arm 11, the connecting arm 11 is fixed to one side of the objective table 2, and a reinforcing rib is arranged between the connecting arm 11 and the objective table 2. As long as the connecting rigidity of the connecting arm 11 and the objective table 2 and the rigidity of the objective table 2 are enough, stable lifting of the objective table 2 can be realized, and the displacement precision of the objective table 2 required by 3D printing is achieved.

The Z-axial 17-direction moving unit is provided with a Z-axial 17 support, the driving motor 9 and the transmission mechanism of the Z-axial 17-direction moving unit are arranged on the Z-axial 17 support, and the Z-axial 17 support is connected with the nut of the X-axial 15-direction moving unit and the nut of the Y-axial 16-direction moving unit at the same time; and the transmission mechanism is the lead screw 10 and nut mechanism with lead screw 10 rotation and nut translation, and the extrusion nozzle 7 and the SLA light source 4 are fixed on the nut of the Z-axial 17-direction moving unit. Therefore, the Z-axial 17-direction moving unit can move at any point position of the XOY plane.

An SLA objective table 2 descending type printing mode is combined with the extrusion type printing mode, the light source 4 and the extrusion nozzle 7 are both located on the objective table 2, fusion of the two printing modes can be achieved only by adjusting the position of the Z axis 17, tool setting is simplified, and the structure of the objective table 2 and the structure of the objective table lifting mechanism are simplified.

Example 8

Cornea bears 70% of the refractive power of the human eyes, the existing ametropia surgical treatment methods, from the earliest PRK and LASIK to three mainstream full-laser surgeries at present, namely, the femtosecond LASIK surgery, the full-excimer TPRK surgery and the small-incision femtosecond laser matrix lens resection (SMILE), are all used for cutting and removing the original cornea to achieve the purpose of changing the refractive power of the cornea. However, due to the fact that the cornea conditions of many patients are poor, for example, the cornea is too thin, and light allergy and other factors, laser surgical treatment cannot be adopted for them. For cutting of the original cornea, due to the fact that the cornea becomes thin, the intraocular pressure changes, and the mechanical property is weakened, light sensitivity, blurred vision under weak illumination, the keratoconus and other diseases are caused. In part of the surgical modes, such as the half-femtosecond surgery, the process of attracting the eyeball through negative pressure exists, certain pressure is generated for the vitreous body in the process, and then the vitreous body turbidity, the *muscae* volitantes and other problems are caused. Data of the food and drug department of the American government show that within six months of the existing laser surgery, due to the fact that the autologous tissue of the cornea is lost, as much as 28% of people have the xerophthalmia, 16% of people have blurred vision, and 18% of people cannot drive at night.

Besides cutting the original cornea, a method for treating ametropia by adopting a corneal plastic lens is also provided. The corneal plastic lens is only suitable for underage children, and needs to be manually worn every night, and the problems of infection, corneal epithelium and eyelid abrasion, etc. can be caused due to improper operation and compliance difference of a wearer. The problems of dry eyes, etc. can be caused by oxygen deprivation of the corneal plastic lens. The problems of corneal astigmatism and cone body appearance can also be caused by artificial thinning of the cornea. The corneal plastic lens cannot fundamentally treat myopia, and the phenomenon of vision rebound after wearing is stopped may also occur. The cost is relatively high, and the corneal plastic lens belongs to disposable contact lenses and needs to be replaced periodically according to production specifications.

In addition, by adopting ICL operation, the problem of ametropia can be treated by implanting an intraocular lens with diopter. Compared with laser operation and a corneal plastic mirror, the ICL operation has no influence on the cornea, but penetration operation is performed on the cornea, this operation belongs to an intraocular operation, it has certain risks and complications, and possibly causes the problems of anterior chamber infection, etc. The operation has great requirements on the depth of the anterior chamber, the patient with an excessively shallow anterior chamber is not suitable for the intraocular lens implantation operation, and the operation easily causes corneal endothelium abrasion, and the corneal endothelium is non-renewable or causes irreversible consequences. The operation injury in the ICL implantation process and the contact between the ICL lens and a natural lens after the operation possibly cause cataract, so it is urgently needed to provide a method for changing the eye diopter capability without cutting off autologous corneal tissues.

A method for implanting the corneal prosthesis comprises the steps that the corneal prosthesis which has a refraction function and is of a complex curved hollow structure is obtained, and the corneal prosthesis is provided with a functional surface attached to the eyeball of a patient; and in the operation process, a bag with an opening located in the cornea is manufactured on the cornea of a receiver, and the corneal prosthesis is implanted into the bag, laid flat and washed with equilibrium liquid.

According to the solution, the mode that the refractive index is changed by removing corneal tissue in a laser operation is replaced with the mode that the corneal prosthesis is added into the cornea to change the refractive index. A series of postoperative problems caused by corneal autologous tissue deficiency are avoided. Meanwhile, the bag implanting mode is adopted, thus the suturing procedure is omitted, and the problems of tissue abrasion, leakage, infection and the like possibly caused by risks are avoided.

The corneal prosthesis can be obtained through the method in the examples 1~4 and can also be obtained through a printer in the examples 5-7.

In the preferred operation solution, the length of the opening of the bag ranges from 3 mm to 5 mm. The opening of the bag is located above the cornea.

When the corneal prosthesis is a convex lens, the solution is used for treating myopia. When the corneal prosthesis is a concave lens, the solution is used for treating presbyopia.

All patents and publications mentioned in the Specification of the present invention are public technologies in the art and can be used in the present invention. All patents and publications cited herein are also listed in the references, as if each publication is specifically and separately cited. The present invention described herein can be implemented in the absence of any one element or multiple elements and in the presence one restriction or multiple restrictions, and such restriction is not specifically stated herein. For example, the terms "comprising", "substantially consisting of" and "consisting of" in each example herein can be replaced by one of the remaining two terms. The terms and expressions used herein are described without limitation. There is no intention to indicate that the terms and explanations described in this Specification exclude any equivalent features. However, it can be understood that any appropriate changes or modifications can be made within the scope as claimed in the appended claims of the present invention. It can be understood that the examples described herein are some preferred embodiments and features. Any ordinary person skilled in the art can make some changes and modifications based on the essence of the description of the present invention. These changes and modifications are also considered to fall within the scope of the present invention and the scope claimed by the appended independent claims and dependent claims.

The invention claimed is:

1. A 3D printing method for the complex curved hollow structure, comprising the following steps: a bottom die to which the complex curved hollow structure is attached is manufactured, and the bottom die is provided with a molding surface C with the shape consistent with that of the complex curved surface to be molded; then the bottom die serves as a support, and the complex curved hollow structure is molded on the molding surface C of the bottom die; and molding of the bottom die and molding of the complex curved hollow structure are completed under the same world coordinate system, that is, after the bottom die is molded, a to-be-molded part is printed on the molding surface C of the bottom die in situ, and the bottom die does not need to be taken down from an objective table and then transplanted into a printing system of the to-be-molded part;

the molding of the bottom die and the molding of the complex curved hollow structure are located under the same world coordinate system and are achieved by sharing the objective table by two sets of printing systems, after the bottom die is molded on the objective table, the bottom die and a molding part of the complex curved hollow structure are subjected to tool setting, and then additive molding is achieved on the molding surface C of the bottom die; when the complex curved hollow structure is molded in an extrusion mode, the molding part is an extrusion nozzle; if SLA molding is adopted, the molding part is an optical part for curing materials;

the solid model of the bottom die is manufactured by using a DLP molding method, during DLP molding, the bottom die is arranged at the lower part, the objective table is arranged at the upper part, and the bottom die is molded on the objective table in a lifting manner; after the bottom die is molded, the objective table rotates around a middle shaft by 180 degrees, so that the bottom die is arranged at the upper part, and the objective table is arranged at the lower part; the extrusion nozzle and the bottom die are subjected to tool setting, a coordinate system of the solid model of the bottom die in an extrusion method is identical to that of the solid model of the bottom die in the DLP molding method, and the extrusion nozzle is aligned with a starting point position of molding in the extrusion method.

2. The 3D printing method for the complex curved hollow structure according to claim 1, wherein a specific molding method of the bottom die and the complex curved hollow structure is provided, and the method comprises the following steps: a digital model of the bottom die is established, and the shape of the molding surface C of the bottom die is the surface shape of the eyeball implanted into the conical prosthesis; a digital model of the to-be-molded part is obtained on the surface of the digital model of the bottom die, and the digital model of the to-be-molded part is the conical prosthesis of the complex curved hollow structure; and 3D printing path planning is conducted on the digital model of the to-be-molded part, and additive printing is conducted by using the extrusion mode and taking the molding surface C of the bottom die as a support.

3. The 3D printing method for the complex curved hollow structure according to claim 1, wherein the center of the DLP light source is aligned with the center of the objective table, and the center of an extrusion path in the extrusion method is overlapped with the center of the objective table.

4. The 3D printing method for the complex curved hollow structure according to claim 1, an SLA molding method is used to replace DLP molding method, the SLA molding method is used for manufacturing the solid model of the bottom die, during SLA molding, the bottom die is arranged on the upper part, the object table is arranged on the lower part, and the object table sinks to form the bottom die; after the bottom die is molded, a light source of the SLA is evacuated, the extrusion nozzle and the bottom die are subjected to tool setting, the world coordinate system of the bottom die solid model in the extrusion method is identical to that of the bottom die solid model in the DLP molding method, and the extrusion nozzle is aligned with the starting point position of extrusion method molding.

5. The 3D printing method for the complex curved hollow structure according to claim 1, the surface of the digital model of the cornea is divided into four parts, the first part is a circular area with the radius being 2 mm in the center of the visual axis of the cornea, the curvature change range of the area is smaller than 0.25 D, and the thickness is uniform; the second part is a side central area, the side central area is an annular area with the radius being 2-4 mm away from the center of the visual axis of the cornea, the curvature radius of the side central area is gradually increased from inside to outside, and the side central area is in smooth transition to an edge plane from the central spherical surface; the third part is a peripheral area, the peripheral area is an annular area with the radius being 4-5 mm away from the center of the visual axis of the cornea, and the peripheral area is an approaching flat surface; and the fourth part is a corneal limbus area, the corneal limbus area is an annular area for transition from the cornea to the sclera, and the thickness of the corneal limbus area is in smooth and uniform transition from the peripheral area to the sclera.

6. The 3D printing method for the complex curved hollow structure according to claim 1, the biological ink is in a liquid phase range during extrusion, and an extrusion nozzle extrudes materials in the form of liquid drops, and the liquid drops are spin-coated on a molding surface C of a bottom film by utilizing the relative motion of the extrusion nozzle and a bottom die; after the whole layer of liquid drops are spin-coated, the whole layer of materials are photo-cured, and a to-be-molded part is molded.

7. The 3D printing method for the complex curved hollow structure according to claim 4, the surface of the digital model of the cornea is divided into four parts, the first part is a circular area with the radius being 2 mm in the center of the visual axis of the cornea, the curvature change range of the area is smaller than 0.25 D, and the thickness is uniform; the second part is a side central area, the side central area is an annular area with the radius being 2-4 mm away from the center of the visual axis of the cornea, the curvature radius of the side central area is gradually increased from inside to outside, and the side central area is in smooth transition to an edge plane from the central spherical surface; the third part is a peripheral area, the peripheral area is an annular area with the radius being 4-5 mm away from the center of the visual axis of the cornea, and the peripheral area is an approaching flat surface; and the fourth part is a conical limbus area, the corneal limbus area is an annular area for transition from the cornea to the sclera, and the thickness of the corneal limbus area is in smooth and uniform transition from the peripheral area to the sclera.

8. The 3D printing method for the complex curved hollow structure according to claim 6, the to-be-molded part model is sliced in the height direction, and the path of the extrusion nozzle in each layer thickness is a complete circle; the extrusion nozzle only walks on one circular track in each layer, after liquid drops are extruded, the surface of the bottom die is coated with the liquid drops, and the extrusion nozzle coats the bottom die with a circle of biological ink in each layer.

* * * * *